(12) United States Patent
Unglaub et al.

(10) Patent No.: US 10,366,506 B2
(45) Date of Patent: Jul. 30, 2019

(54) HYPERACUITY SYSTEM AND METHODS FOR REAL TIME AND ANALOG DETECTION AND KINEMATIC STATE TRACKING

(71) Applicant: Lamina Systems, Inc., Colorado Springs, CO (US)

(72) Inventors: Ricardo A. G. Unglaub, Colorado Springs, CO (US); Michael Wilcox, Colorado Springs, CO (US); Paul Swanson, Monument, CO (US); Chris Odell, Colorado Springs, CO (US)

(73) Assignee: LAMINA SYSTEMS, INC., Colorado Springs, CO (US)

( * ) Notice: Subject to any disclaimer, the term of this patent is extended or adjusted under 35 U.S.C. 154(b) by 357 days.

(21) Appl. No.: 14/935,352

(22) Filed: Nov. 6, 2015

(65) Prior Publication Data

US 2016/0134806 A1    May 12, 2016

Related U.S. Application Data

(60) Provisional application No. 62/077,095, filed on Nov. 7, 2014, provisional application No. 62/079,688, filed on Nov. 14, 2014.

(51) Int. Cl.
| | |
|---|---|
| *H04N 7/00* | (2011.01) |
| *G06T 7/73* | (2017.01) |
| *G06T 5/50* | (2006.01) |
| *G06T 3/40* | (2006.01) |
| *G06T 7/246* | (2017.01) |

(52) U.S. Cl.
CPC ............. *G06T 7/73* (2017.01); *G06T 3/4053* (2013.01); *G06T 5/50* (2013.01); *G06T 7/246* (2017.01); *G06T 2207/10052* (2013.01)

(58) Field of Classification Search
CPC .......................... H04N 13/139; H04N 13/351
USPC .......................................................... 348/43
See application file for complete search history.

(56) References Cited

U.S. PATENT DOCUMENTS

| | | | |
|---|---|---|---|
| 4,181,398 | A | 1/1980 | Sick |
| 4,286,760 | A | 9/1981 | Couderc et al. |
| 4,479,717 | A | 10/1984 | Cornillault |
| 5,196,689 | A | 3/1993 | Sugita et al. |
| 5,206,499 | A | 4/1993 | Mantravadi et al. |

(Continued)

OTHER PUBLICATIONS

International Preliminary Report on Patentability for PCT/US2015/059625 dated May 9, 2017, 7 pages.

(Continued)

*Primary Examiner* — Richard T Torrente
(74) *Attorney, Agent, or Firm* — Kilpatrick Townsend & Stockton LLP

(57) ABSTRACT

Methods and systems described herein determine a location of a tracked object with respect to a coordinate system of a sensor array by using analog signals from sensors having overlapping nonlinear responses. Hyperacuity and real time tracking are achieved by either digital or analog processing of the sensor signals. Multiple sensor arrays can be configured in a plane, on a hemisphere or other complex surface to act as a single sensor or to provide a wide field of view and zooming capabilities of the sensor array. The processing methods can be used to adjust to contrast reversals between an image and the background.

17 Claims, 32 Drawing Sheets

(56) References Cited

U.S. PATENT DOCUMENTS

| | | | |
|---|---|---|---|
| 5,214,492 | A | 5/1993 | LoBianco et al. |
| 5,220,398 | A | 6/1993 | Horn et al. |
| 5,541,652 | A | 7/1996 | Jackson et al. |
| 5,642,299 | A | 6/1997 | Hardin et al. |
| 5,742,325 | A | 4/1998 | Curry et al. |
| 5,814,524 | A | 9/1998 | Walt et al. |
| 5,847,398 | A | 12/1998 | Shahar et al. |
| 5,905,567 | A | 5/1999 | Dewan |
| 5,909,967 | A | 5/1999 | Dewan |
| 5,917,191 | A | 6/1999 | Cheng |
| 6,175,107 | B1 | 1/2001 | Juvinall |
| 6,215,113 | B1 | 4/2001 | Chen et al. |
| 6,529,281 | B2 | 3/2003 | Takeshita et al. |
| 6,573,488 | B1 | 6/2003 | Takeshita et al. |
| 6,765,195 | B1 | 7/2004 | Leviton |
| 6,781,694 | B2 | 8/2004 | Nahum et al. |
| 6,828,559 | B2 | 12/2004 | Griffin et al. |
| 7,773,143 | B2 | 8/2010 | Feldman et al. |
| 8,344,342 | B2 | 1/2013 | Barrett et al. |
| 2004/0042653 | A1* | 3/2004 | Hu .......... G06T 5/007 382/167 |
| 2004/0193670 | A1 | 9/2004 | Langan et al. |
| 2004/0227109 | A1 | 11/2004 | Storm et al. |
| 2005/0279917 | A1 | 12/2005 | Barrett et al. |
| 2008/0179490 | A1* | 7/2008 | Ohno .......... G01J 1/4228 250/201.1 |
| 2012/0001058 | A1 | 1/2012 | Luke et al. |
| 2013/0208126 | A1 | 8/2013 | Barrett et al. |
| 2013/0322753 | A1* | 12/2013 | Lim .......... G06T 5/001 382/167 |
| 2016/0175530 | A1 | 6/2016 | Mide et al. |

OTHER PUBLICATIONS

International Search Report and Written Opinion for PCT/US15/59625 dated Feb. 17, 2016, 8 pages.

D. T. Riley. W. Harman, S. F. Barrett, and C. H. G. Wright, "Musca domestica inspired machine vision sensor with hyperacuity," IOP Journal of Bioinspiration & Biomimetics, vol. 3, No. 2, Jun. 2008.

Harman, W., et al., "Biomimetic Machine Vision System," $42^{nd}$ Annual Rocky Mountain Bioengineering Symposium 2005, Instrument Society of America, Apr. 2005, 8 pages.

Madsen, R., et al., "Software Model of a Machine Vision System Based on the Common House Fly," $42^{nd}$ Annual Rocky Mountain Bioengineering Symposium 2005, Instrument Society of America, Apr. 2005, 7 pages.

Wilcox, M. et al., "A Retina with Parallel Input and Pulsed Output, Extracting High-Resolution Information," IEEE Transactions on Neural Networks, vol. 10, No. 3, May 1999, 10 pages.

Wright, C., et al., "Using parallel Evolutionary development for a Biologically-Inspired Computer Vision System for Mobile Robots," $42^{nd}$ Annual Rocky Mountain Bioengineering Symposium 2005, Instrument Society of America, Apr. 2005, 8 pages.

U.S. Appl. No. 11/051,850, filed Feb. 4, 2005, Office Action dated Feb. 22, 2013, 6 pages.

U.S. Appl. No. 11/051,850, filed Feb. 4, 2005, Office Action dated Sep. 4, 2007, 7 pages.

U.S. Appl. No. 11/051,850, filed Feb. 4, 2005, Advisory Action dated May 4, 2007, 3 pages.

U.S. Appl. No. 11/051,850, filed Feb. 4, 2005, Final Office Action dated Feb. 20, 2007, 6 pages.

U.S. Appl. No. 11/051,850, filed Feb. 4, 2005, Office Action dated Sep. 29, 2006, 8 pages.

U.S. Appl. No. 11/051,850, filed Feb. 4, 2005, Requirement for Restriction/Election dated Jul. 20, 2006, 6 pages.

U.S. Appl. No. 11/150,478, filed Jun. 11, 2005, BPAI Decision dated Jun. 22, 2012, 14 pages.

U.S. Appl. No. 11/150,478, filed Jun. 11, 2005, Appeal Brief filed Feb. 27, 2009, 16 pages.

U.S. Appl. No. 11/150,478, filed Jun. 11, 2005, Final Office Action dated Mar. 14, 2007, 8 pages.

U.S. Appl. No. 11/150,478, filed Jun. 11, 2005, Office Action dated Oct. 16, 2006, 10 pages.

U.S. Appl. No. 11/150,478, filed Jun. 11, 2005, Advisory Action dated Jul. 20, 2006, 3 pages.

U.S. Appl. No. 11/150,478, filed Jun. 11, 2005, Final Office Action dated Apr. 25, 2006, 9 pages.

U.S. Appl. No. 11/150,478, filed Jun. 11, 2005, Office Action dated Dec. 28, 2005, 8 pages.

\* cited by examiner

Table-1: $\eta$-coefficients for determining $x$ via equation (18)

| $i$ | $j$ | $\eta_i$ | $\eta_j$ | $\eta_0$ | $\eta_d$ |
|---|---|---|---|---|---|
| 1 | 2 | $+1/(2\beta d)$ | $-1/(2\beta d)$ | 0 | 0 |
| 2 | 3 | 0 | | $+1/(2\beta d)$ | $-d/2$ |
| 3 | 4 | $-1/(2\beta d)$ | 0 | $+1/(2\beta d)$ | $-d/2$ |
| 4 | 5 | $-1/(2\beta d)$ | $+1/(2\beta d)$ | 0 | 0 |
| 5 | 6 | 0 | $+1/(2\beta d)$ | $-1/(2\beta d)$ | $+d/2$ |
| 6 | 1 | $+1/(2\beta d)$ | 0 | $-1/(2\beta d)$ | $+d/2$ |

Table-2: $\gamma$-coefficients for determining $x$ via equation (19)

| $i$ | $j$ | $\gamma_i$ | $\gamma_j$ | $\gamma_0$ | $\gamma_d$ |
|---|---|---|---|---|---|
| 1 | 2 | $+1/(2\beta d\sqrt{3})$ | $+1/(2\beta d\sqrt{3})$ | $-1/(\beta d\sqrt{3})$ | $+d/\sqrt{3}$ |
| 2 | 3 | $+1/(\beta d\sqrt{3})$ | $-1/(2\beta d\sqrt{3})$ | $-1/(2\beta d\sqrt{3})$ | $+d/(2\sqrt{3})$ |
| 3 | 4 | $+1/(2\beta d\sqrt{3})$ | $-1/(\beta d\sqrt{3})$ | $+1/(2\beta d\sqrt{3})$ | $-d/(2\sqrt{3})$ |
| 4 | 5 | $-1/(2\beta d\sqrt{3})$ | $-1/(2\beta d\sqrt{3})$ | $+1/(\beta d\sqrt{3})$ | $-d/\sqrt{3}$ |
| 5 | 6 | $-1/(\beta d\sqrt{3})$ | $+1/(2\beta d\sqrt{3})$ | $+1/(2\beta d\sqrt{3})$ | $-d/(2\sqrt{3})$ |
| 6 | 1 | $-1/(2\beta d\sqrt{3})$ | $+1/(\beta d\sqrt{3})$ | $-1/(2\beta d\sqrt{3})$ | $+d/(2\sqrt{3})$ |

FIG. 5B

Table 3

| Ommatidia Angle | X-Coordinate | X-Coordinate (*) | Y-Coordinate | Y-Coordinate (*) |
|---|---|---|---|---|
| $\theta_0$ = Undefined | $x_{b0} = 0$ | 0 | $y_{b0} = 0$ | 0 |
| $\theta_1 = 040.89339465$ | $x_{b1} = +2d$ | $+0.755928946 d\sqrt{7}$ | $y_{b1} = +\sqrt{3}\, d$ | $+0.654653670 d\sqrt{7}$ |
| $\theta_2 = 100.89339465$ | $x_{b2} = -d/2$ | $-0.188982236 d\sqrt{7}$ | $y_{b2} = +3\sqrt{3}\, d/2$ | $+0.981980506 d\sqrt{7}$ |
| $\theta_3 = 160.89339465$ | $x_{b3} = -2.5d$ | $-0.944911182 d\sqrt{7}$ | $y_{b3} = +\sqrt{3}\, d/2$ | $+0.327326835 d\sqrt{7}$ |
| $\theta_4 = 220.89339465$ | $x_{b4} = -2d$ | $-0.755928946 d\sqrt{7}$ | $y_{b4} = -\sqrt{3}\, d$ | $-0.654653670 d\sqrt{7}$ |
| $\theta_5 = 280.89339465$ | $x_{b5} = +d/2$ | $+0.188982236 d\sqrt{7}$ | $y_{b5} = -3\sqrt{3}\, d/2$ | $-0.981980506 d\sqrt{7}$ |
| $\theta_6 = 340.89339465$ | $x_{b6} = +2.5d$ | $+0.944911182 d\sqrt{7}$ | $y_{b6} = -\sqrt{3}\, d/2$ | $-0.327326835 d\sqrt{7}$ |

FIG. 17C

HYPERACUITY SYSTEM AND METHODS FOR REAL TIME AND ANALOG DETECTION AND KINEMATIC STATE TRACKING

CROSS-REFERENCE TO RELATED APPLICATIONS

This application claims priority to U.S. Provisional Patent Application No. 62/077,095, filed Nov. 7, 2014, and also claims priority to U.S. Provisional Patent Application No. 62/079,688, filed Nov. 14, 2014, both of which are incorporated by reference herein in their entirety.

BACKGROUND OF THE INVENTION

Optical sensing, detecting, and tracking devices may comprise a lens system to project light rays from a segment of an environment onto a planar or other surface. One such device is shown schematically in FIG. 1. The surface may comprise an array of photo sensors that create electronic signals from the projected light. Examples of photo sensors include charge coupled devices (CCD) having a planar rectangular array of distinct light receptors that produce a respective pixel of the projected light, such as are used in digital cameras. Typically each such receptor in a CCD generates a voltage corresponding to the light amplitude level integrated over the exposure time. Also, the values of the pixels in a CCD are typically taken at specific time instants, rather than having a continuous time, or real-time, output. That is, the received light is digitally sampled in time by the CCD rather than producing a real-time analog output. Such devices typically include electronics that may amplify the sensor signals from the optical sensors and applying signal processing to the sensor signals to obtain desired output results, such as position, motion and acceleration of an object. Other types of photo sensors may be chosen, depending on the application.

Depending on the application, other detecting and tracking devices may be based on non-visible electromagnetic radiation. Still other detecting and tracking devices may be based on non-electromagnetic phenomena.

However, many current devices using multiple sensors typically are configured so that the sensors only react or respond to inputs local to themselves. Inputs impinging on other nearby sensors are considered to be problems to be avoided or designed around. This limits the overall resolution of, for example, location detection.

BRIEF SUMMARY OF THE INVENTION

Systems and methods are disclosed for object detection and tracking using multiple sensors, such as photo sensors or acoustic wave sensors, that are arranged to have overlapping output response profiles. The sensors' outputs can then be differenced or combined to produce a location accuracy at least, and often better, than what could be achieved by the same sensors without overlapping profiles. An arrangement of sensors having such overlapping output response profiles is termed an ommatidium (plural: ommatidia).

Hyperacuity is the ability of a detection or tracking device or system to discriminate a minimal angular displacement of an object moving in the system's field of view that is smaller than the sensor dimension or spacing. The hyperacuity of such systems can be limited only by the system electronics. In preferred embodiments, analog electronics are used to achieve faster results by avoiding limitations due to sampling rate; nevertheless, the methods and systems can still be implemented in digital electronics.

Multiple ommatidia can be organized into a single system to achieve various advantages, such as increased resolution and/or wider field of view. Also, a multiple ommatidia can be organized hierarchically to achieve zooming capability for detection and tracking.

Multiple ommatidia can be configured on surface to provide a wide field of view (FoV) for detection and tracking. The multiple ommatidia can use combined methods of detection and tracking, and may use IR, visible, or polarization detection.

BRIEF DESCRIPTION OF THE DRAWINGS

FIGS. 5A and 5B respectively show a functional diagram for a circuit to implement a differencing method and Tables of coefficients to use with the circuit components, according to embodiments.

FIGS. 17A, 17B and 17C show the geometry of a multi-ommatidia system and a corresponding table of parameters, according to embodiments.

DETAILED DESCRIPTION OF THE INVENTION

I. Introduction

Figure 1:
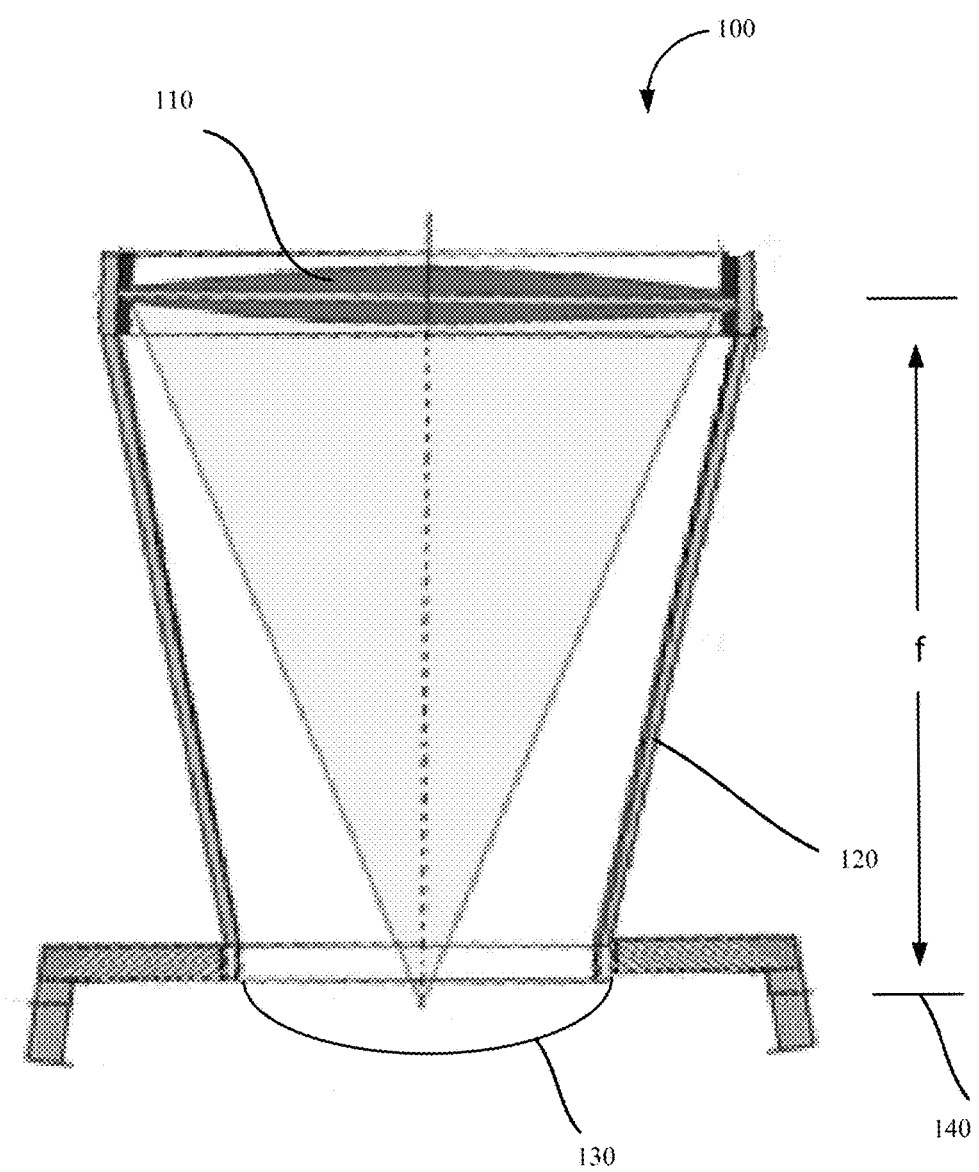
FIG. 1 shows a structure of a tracking system comprising an ommatidium, according to an embodiment.

Systems and methods are disclosed in which multiple sensors are arranged to form a combined sensing unit, called an ommatidium. The sensors may be of any of a variety of physical phenomena, such as visible, infrared or other electromagnetic waves, acoustic waves, or light polarization.

In exemplary embodiments the sensors in an ommatidium have overlapping output response profiles. This overlapping response is typically non-linear, and is in fact used to achieve a higher location resolution (hyperacuity) than would a system using similar sensors without such overlap. Further, exemplary embodiments will make use of analog components, such as fast logarithmic amplifiers, to achieve fast detection and tracking that is not limited by a sampling rate, as in a digital system. The methods and systems can nevertheless be implemented with sampling and digital processing.

For simplicity of exposition, the exemplary embodiments disclosed herein will be of methods for, and systems of, photo sensors but it will be clear to one of skill in the art that the methods and systems are not restricted to photo sensor systems. The methods and systems described herein for optical (visual light) based sensing and tracking using photo sensors will be seen as readily adaptable to other frequency ranges (such as infrared, ultraviolet or x-ray) of electromagnetic radiation for corresponding sensors and imaging devices. Further, the methods and systems in fact will be seen as readily adaptable to location and tracking devices based on other physical phenomena, such as for sonar devices that sense acoustic waves.

The following sections describe different embodiments of the inventions. Part II discloses systems and methods based on a single ommatidium array of sensors. Methods of achieving hyperacuity include differencing methods that may use logarithmic amplification of sensor signals and analog electronics for real-time tracking. Other methods disclosed include orthogonal decomposition methods that use sinusoidal weighting of the sensor signals to form a pair of resultant signals which are used to achieve hyperacuity tracking Part III discloses systems and methods based on multiple ommatidia arrays. Such systems may use a single lens or multiple lenses. Part IV discloses embodiments directed to HYPRIS™ systems, which may use multiple ommatidia systems to achieve wide field of view, and other tracking and imaging results.

II. Single Ommatidia Systems and Methods

The methods and systems disclosed in this section combine multiple sensors to function as a single location or position detection (herein just "detection") and location tracking (herein just "tracking") device. Part A describes exemplary physical system structures that may be used to implement the systems and methods. Part B describes methods based on differencing, and Part C describes alternate methods based on orthogonal decomposition of the sensor signals. Part D describes how the methods and systems can implement trajectory tracking Part E describes methods to compensate when a sensor's output signal response to an image feature of a detected/tracked object in fact is darker than the output response to the imaged background. Part F describes ways to combine the various methods.

A. Single Ommatidium Systems

FIG. 1 shows an exemplary detection and tracking system 100 that can make use of the methods and systems disclosed herein. In this example, a supporting structure 120 encloses a lens 110, with a focal length f, 140, that focuses light onto a sensor field 130. The sensor field can comprise a plurality of sensor arrangements, as now described.

Figure 2A:
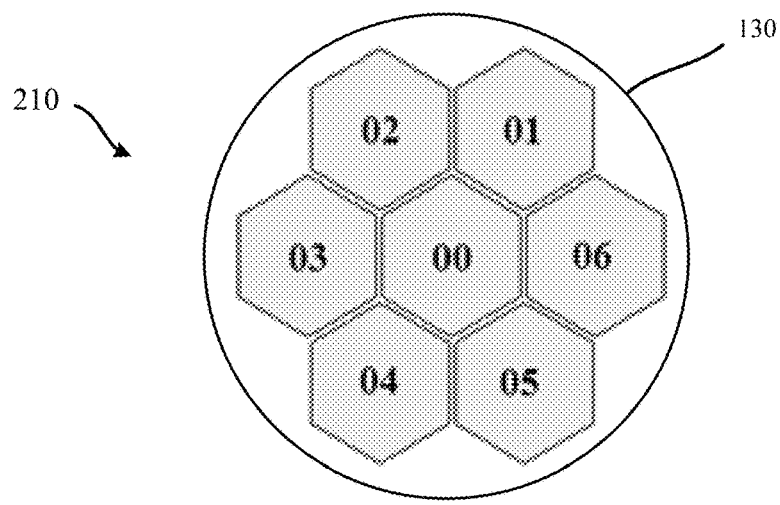
FIGS. 2A, 2B, 2C, and 2D shows configurations of sensors arranged to form a single ommatidium to achieve hyperacuity, according to embodiments.
Figure 2B:
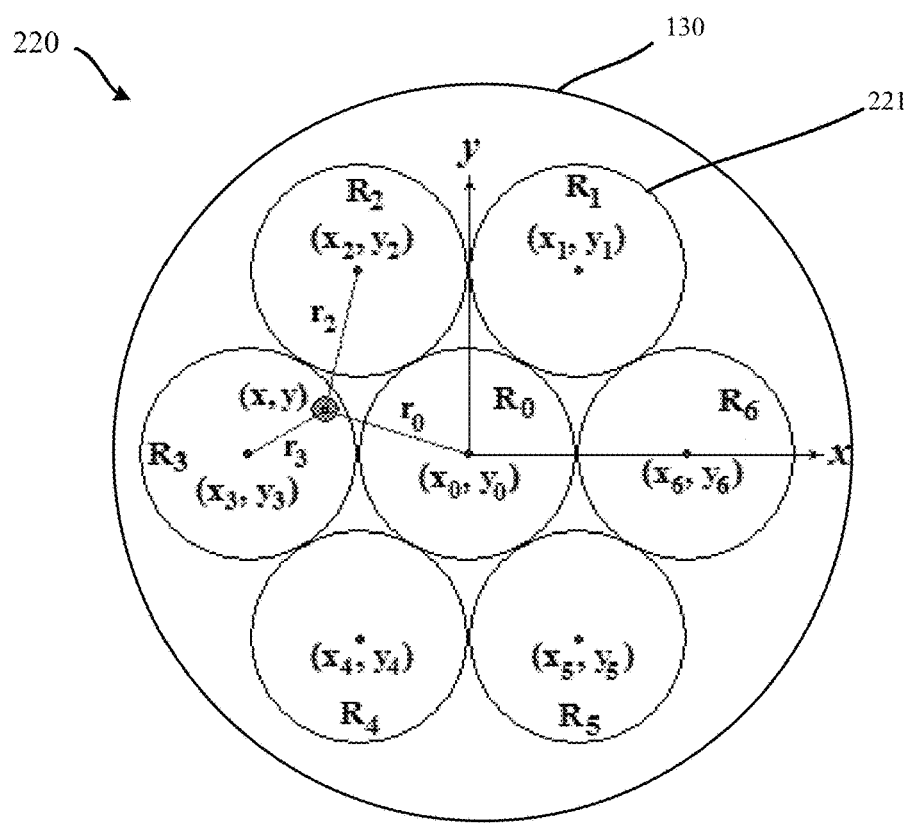

FIGS. 2A, 2B, 2C, and 2D show exemplary configurations of sensors: respectively 210, 220, 230 and 240. For the case that the sensors are photo sensors, these can be arranged on the sensor field 130. FIG. 2A shows a first embodiment of an ommatidium configuration, in which seven sensors are arranged around a central sensor. Depending on the shape of the individual sensors, a similar configuration is shown in FIG. 2B for circular sensors.

Figure 3:
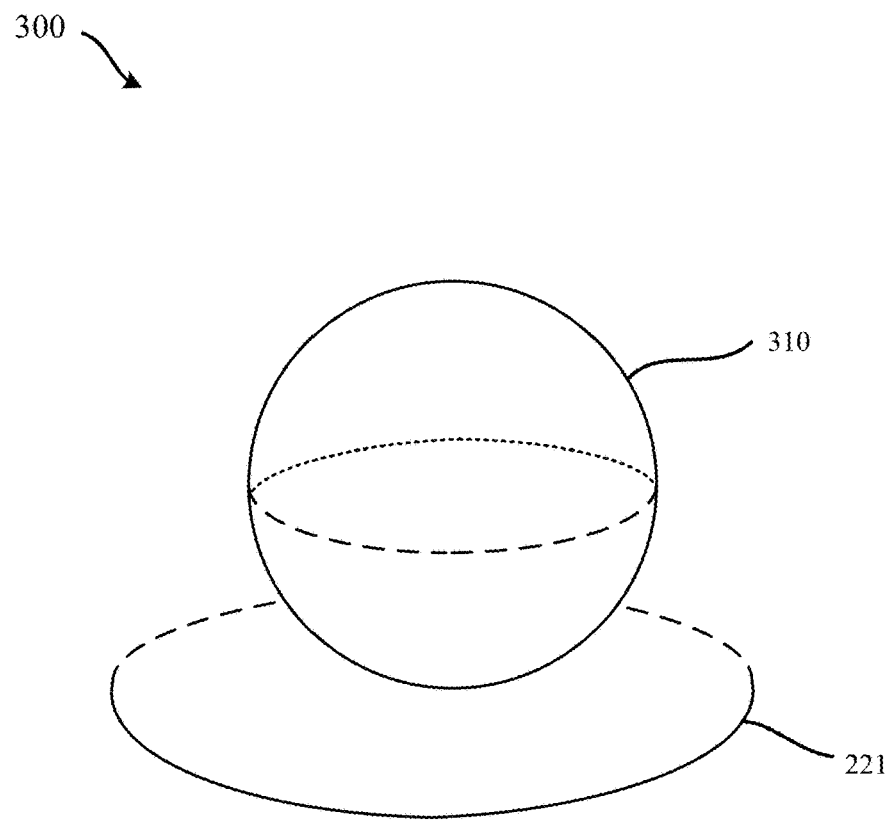
FIG. 3 shows an embodiment of a sensor configured with a lens, according to embodiments.
Figure 4:
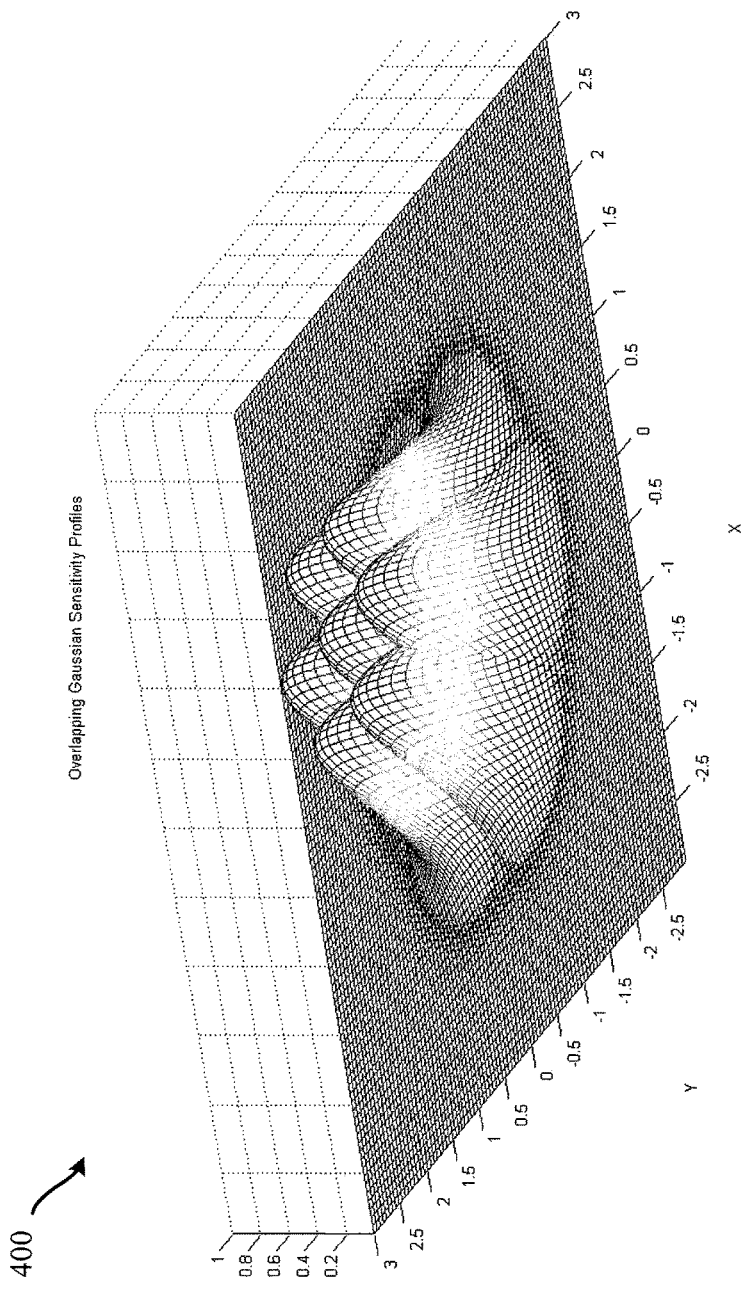
FIG. 4 shows overlapping Gaussian response profiles of sensor signals within an ommatidium, according to an embodiment.

In FIG. 2B the sensors $R_0, \ldots R_6$ are arranged geometrically to form an ommatidium disposed in a hexagonal pattern around the central sensor $R_0$. Each sensor has a unique and well-defined location relative to the central sensor which is also the central or reference point of the ommatidium. When composed of photo sensors, a beam of light incident on this array of sensors will form an image spot on a given sensor, indicated at point (x, y) on $R_3$. Depending the output response profile of the sensors, as shown in FIG. 3, one or more of the lenses may use the configuration 300 in which there is a surface mounted lens 310 on the sensor. The combination of lens 110 and lens 310 may implement a response profile of the sensor that is Gaussian and/or overlaps with the response profile of neighboring sensors. An example of overlapping response profiles for the configuration of FIG. 2B is shown in FIG. 4 and described further below.

The described sensor response profile is to be a monotonically decreasing function from each sensor's center; these decaying functions include but are not limited to Gaussian, Airy, cosine power, sin(x)/x, sin c(x), $(1-x^2)^n$ polynomials, etc. There are several ways to generate the nonlinear response profile, including nonlinear doping of the detector, optical termination, waveguide transmission, and intentional image feature blurring to achieve the desired response profile. Each sensor has an overlapping field of view with its adjacent neighbors.

Figure 2C:
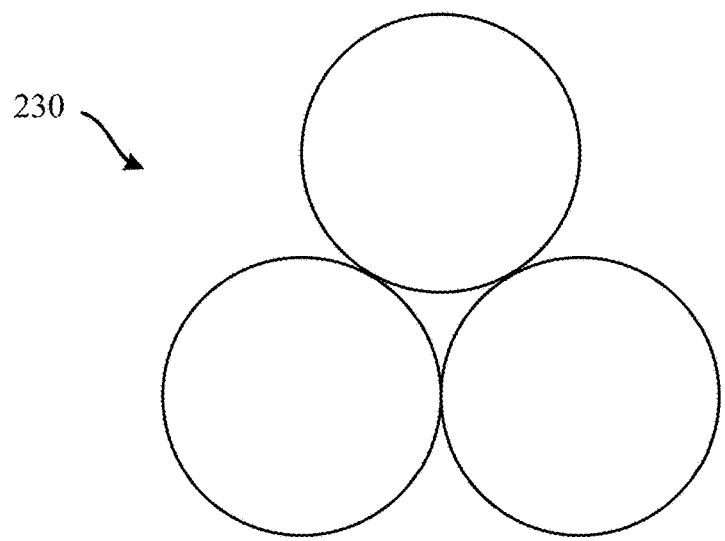
Figure 2D:
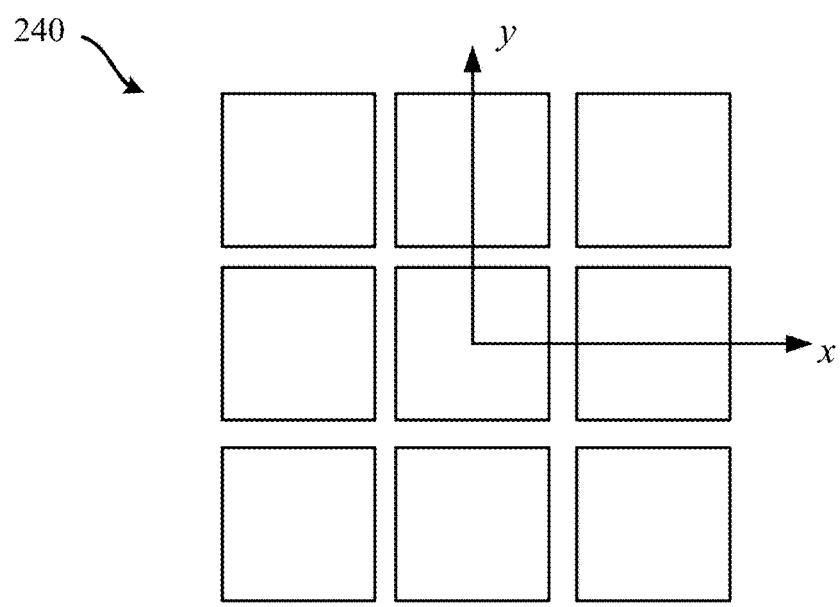

FIGS. 2C and 2D show ommatidia with alternate arrangements 230 and 240 of sensors. The methods described below can be also be adapted to these configurations, as will be clear to one of skill in the art after understanding the following descriptions.

B. Differencing Systems and Methods

This part describes differencing methods by which the exemplary arrangements of multiple individual sensors into ommatidia previously described can implement hyperacuity detection and tracking.

Embodiments of the differencing method will be disclosed by way of example using the seven sensor hexagonal ommatidium configuration of FIG. 2B. From the derivation given below it will be clear to one of skill in the art how the methods can be adapted for ommatidia having other configurations.

For this example case, each sensor is assumed to have a Gaussian-type, axisymmetric response profile, as exemplified in FIG. 4, that overlaps with adjacent sensors. An image spot is shown located at position (x, y) in the array's coordinate system in FIG. 2B. An image feature of the object produces a light spot that is sensed by several neighboring sensors due to their overlapping fields of view. The location of the image spot's center as observed from the center of the photo sensors $R_0$, $R_2$ and $R_3$ in FIG. 2B can be expressed by the set of equations $$(x-x_0)^2+(y-y_0)^2=r_0^2$$

$$(x-x_2)^2+(y-y_2)^2=r_2^2$$

$$(x-x_3)^2+(y-y_3)^2=r_3^2 \quad \text{(II.B.1)}$$

The solution of this set of equations can be interpreted as the intersection of three circles at the point (x, y), the circles having radii $r_0$, $r_2$ and $r_3$ centered at $(x_0, y_0)$, $(x_2, y_2)$, and $(x_3, y_3)$, respectively. Taking the difference between the second and the first equation in (II.B.1), and then taking the difference between the third and the first in (II.B.1) yields $$(x-x_2)^2+(y-y_2)^2-(x-x_0)^2-(y-y_0)^2=r_2^2-r_0^2$$

$$(x-x_3)^2+(y-y_3)^2-(x-x_0)^2-(y-y_0)^2=r_3^2-r_0^2 \quad \text{(II.B.2)}$$

respectively. Letting the point $(x_0, y_0)=(0, 0)$ be the origin, which coincides with the geometric center of the array, the set (II.B.2) then becomes $$(-2x_2)x+(-2y_2)y=r_2^2-r_0^2-x_2^2-y_2^2$$

$$(-2x_3)x+(-2y_3)y=r_3^2-r_0^2-x_3^2-y_3^2 \quad \text{(II.B.3)}$$

The right hand sides of (II.B.3) are constant values:

$$A=r_2^2-r_0^2-x_2^2-y_2^2$$

$$B=r_3^2-r_0^2-x_3^2-y_3^2 \quad \text{(II.B.4)}$$

Using Cramer's rule one finds from (II.B.3) and (II.B.4) the unknowns x and y as $$x = \frac{1}{2}\left(\frac{By_2 - Ay_3}{x_2y_3 - x_3y_2}\right), \quad y = \frac{1}{2}\left(\frac{Ax_3 - Bx_2}{x_2y_3 - x_3y_2}\right) \quad \text{(II.B.5)}$$

Once the x and y coordinates of the image-spot have been determined, the angle φ that the spot subtends with respect to the array's reference axis and the distance ρ to the origin and center of the array are given respectively by $$\varphi = \arctan\left(\frac{y}{x}\right), \quad \rho = (x^2 + y^2)^{1/2} \quad \text{(II.B.6)}$$

The term $r_i$ in these equations, i.e. the distances from the image spot center to the center of the photoreceptors, is determined by analyzing the response profile of the ommatidium's sensors. The Gaussian sensor response profile to focused light stimuli has the form:

$$I_i=\hat{I}e^{-\beta r_i^2} \quad \text{(II.B.7)}$$

Equation (II.B.7) represents a Gaussian-like radial-dependence response. In this equation $I_i=I(r_i)$ is the signal intensity or response of the $i^{th}$ sensor to an image spot illuminating the sensor at a distance $r_i$ from the sensor's axis of symmetry, β is a constant that represents the rate of decay of the response with the distance from the center of the sensor. One may relate β to the value σ of the Gaussians used in statistics, the conversion is $\beta=1/(2\sigma^2)$, and $\hat{I}$ is the peak value of the sensor response for a given image spot illuminating the center of the sensor. A cylindrical coordinate system is used here for the sensor response function.

The square of the radial distance at which the image-spot is illuminating the sensor, relative to the sensor's center, can be obtained from (II.B.7) as $$r_i^2 = \frac{1}{\beta}\ln\left(\frac{\hat{I}}{I_i}\right) \quad \text{(II.B.8)}$$

Equation (II.B.8) requires knowing $\hat{I}$ to solve for $r_i$ since only $I_i$, the sensor signal response due to the image spot illuminating at a distance $r_i$, is observed or measured. It will be shown below that the knowledge of this value is not needed, as relative measures of the sensor responses will only be required.

Referring back to FIG. 2B and using equation (II.B.8), one has $$r_2^2 - r_0^2 = \frac{1}{\beta}\ln\left(\frac{\hat{I}}{I_2}\right) - \frac{1}{\beta}\ln\left(\frac{\hat{I}}{I_0}\right) = \frac{1}{\beta}\left[\ln\left(\frac{\hat{I}}{I_2}\right) - \ln\left(\frac{\hat{I}}{I_0}\right)\right]$$

which becomes $$r_2^2 - r_0^2 = \frac{1}{\beta}\ln\left(\frac{I_0}{I_2}\right) \quad \text{(II.B.9)}$$

As shown in (II.B.9), $\hat{I}$ was canceled-out by a logarithmic property. Similarly, $$r_3^2 - r_0^2 = \frac{1}{\beta}\ln\left(\frac{I_0}{I_3}\right) \quad \text{(II.B.10)}$$

Substituting (II.B.9) and (II.B.10) into the right-hand side of (4) produces $$A = \frac{1}{\beta}\ln\left(\frac{I_0}{I_2}\right) - (x_2^2 + y_2^2) = \frac{1}{\beta}\ln\left(\frac{I_0}{I_2}\right) + d^2$$

$$B = \frac{1}{\beta}\ln\left(\frac{I_0}{I_3}\right) - (x_3^2 + y_3^2) = \frac{1}{\beta}\ln\left(\frac{I_0}{I_3}\right) + d^2 \quad \text{(II.B.11)}$$

In (II.B.11), d is the constant distance from the center of the sensor array to each photoreceptor. Substituting A and B from (II.B.11) into (5) give the image spot coordinates (x, y) as $$x = \frac{\frac{y_2}{\beta}\ln\left(\frac{I_0}{I_3}\right) - \frac{y_3}{\beta}\ln\left(\frac{I_0}{I_2}\right) + d^2(y_3 - y_2)}{2(x_2 y_3 - x_3 y_2)} \quad (\text{II.B.12})$$

$$y = \frac{\frac{x_3}{\beta}\ln\left(\frac{I_0}{I_2}\right) - \frac{x_2}{\beta}\ln\left(\frac{I_0}{I_3}\right) - d^2(x_3 - x_2)}{2(x_2 y_3 - x_3 y_2)} \quad (\text{II.B.13})$$

For the general case, one would have $$x = \frac{\frac{y_i}{\beta}\ln\left(\frac{I_0}{I_j}\right) - \frac{y_j}{\beta}\ln\left(\frac{I_0}{I_i}\right) + d^2(y_j - y_i)}{2(x_i y_j - x_j y_i)} \quad (\text{II.B.14})$$

$$y = \frac{\frac{x_j}{\beta}\ln\left(\frac{I_0}{I_i}\right) - \frac{x_i}{\beta}\ln\left(\frac{I_0}{I_j}\right) - d^2(x_j - x_i)}{2(x_i y_j - x_j y_i)} \quad (\text{II.B.15})$$

Applying some algebra, (II.B.14) and (II.B.15) can be written as $$x = \frac{(y_j - y_i)\left[d^2 - \frac{1}{\beta}\ln(I_0)\right] + \frac{1}{\beta}[y_j \ln(I_i) - y_i \ln(I_j)]}{2(x_i y_j - x_j y_i)} \quad (\text{II.B.16})$$

$$y = \frac{(x_j - x_i)\left[\frac{1}{\beta}\ln(I_0) - d^2\right] - \frac{1}{\beta}[x_j \ln(I_i) - x_i \ln(I_j)]}{2(x_i y_j - x_j y_i)} \quad (\text{II.B.17})$$

Since the only variables in (II.B.16) and (II.B.17) are the signals $I_0$, $I_i$, and $I_j$, these equations can be written, respectively, as $$x = \eta_i \ln(I_i) + \eta_j \ln(I_j) + \eta_0 \ln(I_0) + \eta_d \quad (\text{II.B.18})$$

$$y = \gamma_i \ln(I_i) + \gamma_j \ln(I_j) + \gamma_0 \ln(I_0) + \gamma_d \quad (\text{II.B.19})$$

Equations (II.B.18) and (II.B.19) are two linear equations in $\ln(I_i)$, $\ln(I_j)$, and $\ln(I_0)$. The coefficients, using $\Delta = 2(x_i y_j - x_j y_i)$, are given by $$\eta_i = \frac{y_j}{\beta \Delta}, \quad \eta_j = -\frac{y_i}{\beta \Delta}, \quad \eta_0 = -\frac{(y_j - y_i)}{\beta \Delta}, \quad (\text{II.B.20})$$

$$\eta_d = \frac{(y_j - y_i)d^2}{\Delta}, \quad \gamma_i = -\frac{x_j}{\beta \Delta}, \quad \gamma_j = \frac{x_i}{\beta \Delta}, \quad \gamma_0 = \frac{(x_j - x_i)}{\beta \Delta},$$

$$\gamma_d = -\frac{(y_j - y_i)d^2}{\Delta}$$

For the hexagonally packed sensor array in FIG. 1, with j i mod 6, and i=1, 2, ..., 6, one has:

$$x_i = d\cos\left(i\frac{\pi}{3}\right), \quad x_j = d\cos\left[(i+1)\frac{\pi}{3}\right] \quad (\text{II.B.21})$$

$$y_i = d\sin\left(i\frac{\pi}{3}\right), \quad y_j = d\sin\left[(i+1)\frac{\pi}{3}\right]$$

Substituting these into (II.B.20) gives $$\eta_i = \frac{\sin\left[(i+1)\frac{\pi}{3}\right]}{\beta d\sqrt{3}}, \quad \eta_j = -\frac{\sin\left(i\frac{\pi}{3}\right)}{\beta d\sqrt{3}},$$

$$\eta_0 = -\frac{\cos\left[(2i+1)\frac{\pi}{6}\right]}{\beta d\sqrt{3}}, \quad \eta_d = \frac{\cos\left[(2i+1)\frac{\pi}{6}\right]d}{\sqrt{3}}$$

$$\gamma_i = -\frac{\cos\left[(i+1)\frac{\pi}{3}\right]}{\beta d\sqrt{3}}, \quad \gamma_j = \frac{\cos\left(i\frac{\pi}{3}\right)}{\beta d\sqrt{3}},$$

$$\gamma_0 = \frac{\sin\left[(2i+1)\frac{\pi}{6}\right]}{\beta d\sqrt{3}}, \quad \gamma_d = -\frac{\sin\left[(2i+1)\frac{\pi}{6}\right]d^2}{\sqrt{3}}$$

The coefficient values for the seven sensor hexagonal ommatidium of FIG. 2B are given in Table 1 and Table 2 of in FIG. 5B and each have the dimension of length.

Figure 5A:
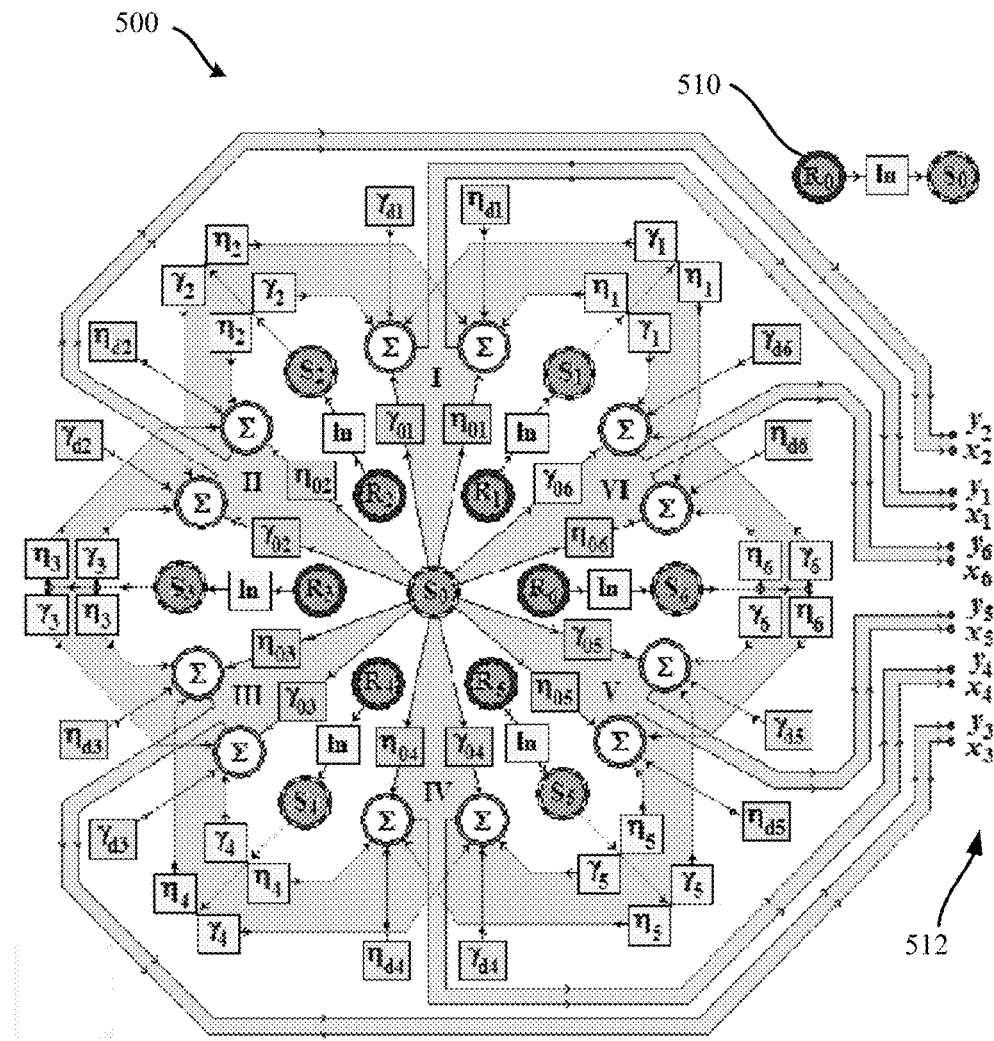

FIG. 5A shows a functional block diagram of an analog circuit implementation of equations (II.B.18) and (II.B.19) that can be realized by summing the logarithmic amplification of the sensor signals with the coefficients of Table 1 and Table 2 of in FIG. 5B. A first advantage of this embodiment is that the accuracy of the calculations depends only on the accuracy of the logarithmic amplifier and the other analog circuitry, and does not have discretization inaccuracies. The calculations also avoid inaccuracies due to time-interval averaging effects that occur when using an analog-to-digital converter to sample the sensor signals at fixed sample times. The sensors are denoted by $R_k$ for k from 0 to 6, with $R_0$ denoting the central sensor. The configuration 510 shows that the output of the sensor $R_0$ is received by a logarithmic amplifier, denoted ln, to produce an amplified output signal $S_0$. This same configuration is also shown being applied to the sensor outputs of sensors $R_k$ for k from 1 to 6. The sigma symbols, as conventional, indicate summing operations, and the coefficients disclosed above are stored as constant sources.

The circuit yields six pairs of solutions 512 as given by the equations above.

While implementation using analog circuitry is a preferred embodiment, the digital sampling of the sensor responses could still be used to implement the solutions given in equations (II.B.18) and (II.B.19). For an ommatidium with an alternative configuration, a comparable analysis will yield an alternate set of coefficients.

That the method for this configuration yields six pairs of solutions implies that up to and including six independently moving objects, producing six separate image features on the ommatidium can be separately located. When the differencing detection method is applied over real time, the separate detections allow for tracking the six moving objects. Generalizing from this to other configurations of ommatidia further implies that if there are a total of n many sensors in an ommatidium with n−1 arranged around a central sensor, then such an ommatidium could be able to detect and track up to n−1 objects.

C. Orthogonal Decomposition Methods and Systems

The methods and systems described in this section can provide location, motion tracking, velocity and acceleration of an image feature traversing the ommatidium. As with the differencing methods and systems, in preferred embodiments the processing may use real time parallel analog processing. Other embodiments may process the sensor signals using sampling with digital circuitry. Exemplary methods generate an orthogonal decomposition of the ommatidium sensor output responses to generate continuous position signals and, through temporal derivatives of the position signals, continuous velocity and acceleration signals of the image feature traversing the ommatidium. As with previous methods and systems, hyperacuity can be achieved.

There are two aspects of the embodiments directed to the orthogonal decomposition methods. The first aspect is related to the creation of the orthogonal signals. The second aspect relates to the processing of the orthogonal signals to generate a radial distance (rho: ρ) and incident angle (phi: ϕ, sometimes also denoted φ) with respect to the ommatidium center of an image feature being tracked as it traverses the ommatidium. At both stages, velocity and acceleration of the image feature can be generated by taking the temporal derivatives of the location/position signals.

As an overview, in some embodiments output signal intensity of the individual ommatidium sensors are correlated with an orthogonal system to provide location and motion tracking of an image feature traversing the ommatidium field of view. The sensor outputs of the ommatidium sensors are weighted with sine and cosine functions and summed using an algorithm to affix position to the sensors within the ommatidium to provide a position of an image feature with respect to the center of the ommatidium. The sums of the weighted sensor outputs represent the real and imaginary mathematical parts of the orthogonal decomposition of the image feature position. For a moving objects, orthogonal intensity components are constantly changing. The ratio of these values can be used to calculate the direction of object motion. Therefore, a change in trajectory can be extracted in real time. The temporal derivative of the position signal yields the velocity of the image feature. The second derivative yields the image feature's acceleration.

Figures 6A, 6B:
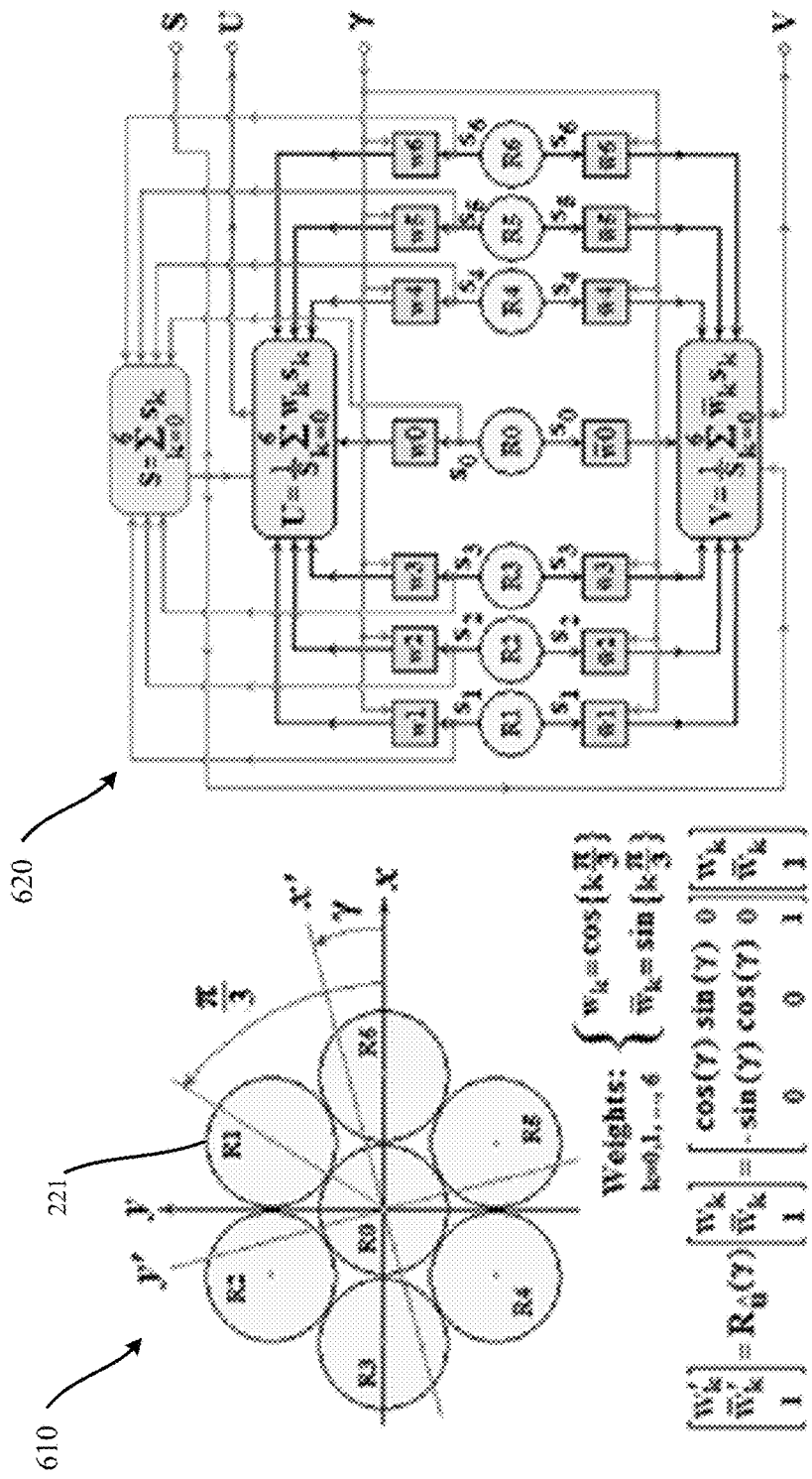
FIGS. 6A and 6B respectively show the geometric parameters underlying an orthogonal decomposition method and a functional diagram for a circuit to implement an orthogonal decomposition method, according to embodiments.

Embodiments of the orthogonal decomposition methods and systems can be understood with reference to the particular embodiment shown in FIG. 6A for the seven sensor hexagonal ommatidium configuration of FIG. 2B. As described above, the sensors are arranged geometrically to form an ommatidium disposed in a hexagonal pattern. Each sensor has a unique and well-defined location relative to the central sensor which is also the central or reference point of the ommatidium. A beam of light incident on this array of sensors will form an image-spot on a given sensor and on the extension of the Gaussian profiles of neighboring sensors. Though the following description is with respect to that configuration, one of skill in the art will see how the methods and systems can be applied to ommatidia of other configurations.

FIG. 6A shows the (x, y) coordinate system for the ommatidium as a whole. In this configuration the angle formed from by the rays from the origin to the center of two adjoining sensors is π/3. FIG. 6A also shows the transformation matrix that can be used to convert the (x, y) coordinate system to a rotated coordinate system (x', y') for a given angle of rotation γ. The method can be applied in the rotated coordinate system.

The orthogonal decomposition of the ommatidium's sensor signals can be best described by means of complex functions and reference to FIG. 6B. In the case here, special optical coupling in each sensor results in a Gaussian sensor response profile which is spatially dependent on the radial distance measured from the center axis of the sensor. This Gaussian profile can be expressed, for the kth-sensor, as $$s_k(\hat{I}_k, r_k) = \eta(\lambda)\hat{I}_k e^{-\beta r_k^2}, k=0, 1, \ldots, 6 \quad \text{(II.C.1)}$$

In (II.C.1), $s_k(\hat{I}_k, r)$ is the sensor response to an assumed thin beam of light of intensity $\hat{I}_k$ illuminating the kth-photoreceptor system normally at a distance $r_k$ from the center of the sensor, $\eta(\lambda)$ is an efficiency factor that includes the photon efficiency of the sensor, the optical transmissivity of the lens system, and other losses which are wavelength (λ) dependent. The signals from the sensor onto which the light beam is impinging and that of the neighboring sensors can be added up to give a resultant system output signal S shown in FIG. 6B. A simulated response of the sensors is as shown in FIG. 4 and was described above.

Significantly more useful information can be obtained by weighting each signal $s_k$ by the complex exponential $$W_k = e^{ik\frac{\pi}{3}} = \cos\left(k\frac{\pi}{3}\right) + i\sin\left(k\frac{\pi}{3}\right) = w_k + i\tilde{w}_k \quad \text{(II.C.2)}$$

This complex function relates the angular positions of the sensors to the (x, y) frame of reference of the sensors arrangement or assembly for one ommatidium. These weights are indicated in FIG. 6A. After multiplying (II.C.1) and (II.C.2) and summing over all k one obtains the composite complex signal $$U + iV = \frac{\sum_{k=1}^{6} \hat{I}_k e^{-\beta r_k^2} e^{ik\frac{\pi}{3}}}{\sum_{k=0}^{6} \hat{I}_k e^{-\beta r_k^2}} = \quad \text{(II.C.3)}$$

$$\left\{\frac{\sum_{k=1}^{6} \hat{I}_k e^{-\beta r_k^2}\cos\left(k\frac{\pi}{3}\right)}{\sum_{k=0}^{6} \hat{I}_k e^{-\beta r_k^2}} + i\frac{\sum_{k=1}^{6} \hat{I}_k e^{-\beta r_k^2}\sin\left(k\frac{\pi}{3}\right)}{\sum_{k=0}^{6} \hat{I}_k e^{-\beta r_k^2}}\right\}$$

It is convenient to call U the real part or component, and V the imaginary part or component of this decomposition of the sensor signals, both of which are mutually orthogonal to each other. FIG. 6B shows a circuit component diagram that can be used to calculate U and V. As above, the sensors are denoted $R_0 \ldots R_6$ as shown producing signals $s_0 \ldots s_6$. The weights are stored as part of the cosine multiplier blocks $w_0 \ldots w_6$ and the further sine blocks. The weights for the alternate (x', y') coordinates can be modified based on an input for the given angle of rotation γ.

Based on (II.C.3), one may calculate the magnitude and the phase of the complex signal sum and express the composite complex signal as $$U + iV = (U^2 + V^2)^{1/2} \cdot \exp\left\{i\tan^{-1}\left(\frac{V}{U}\right)\right\} \quad \text{(II.C.4)}$$

That is, one obtains the magnitude $(U^2+V^2)^{1/2}$ and phase $\varphi=\tan^{-1}(V/U)$ which can be used to locate the position of the image light spot in the ommatidium.

It should be noted that the U and the V signals described here comprise the orthogonal components of the intensity of the ommatidium sensor signals and should not be confused with the I, Q phase decomposition that is utilized in communications and antenna systems. Even though the mathematics of the orthogonal decomposition is comparable, the underlying principle of using sensor intensity instead of phase is novel.

For locating the light spot relative to the ommatidium image space, both the angle φ subtended between the line joining the spot and the ommatidium center and the x-axis of the ommatidium reference frame, and the distance ρ from the center of the ommatidium to the spot location must be computed. The distance is computed as the two-norm of the normalized-by-Σ orthogonal signals U and V, scaled by a number $K_\sigma$ that depends on the one-sigma (or beta-value) of the Gaussian curve utilized. That is, $$\rho = k_\sigma \cdot r \cdot \{(U)^2 + (V)^2\}^{1/2} \qquad \text{(II.C.5)}$$

$$= k_\sigma \cdot r \cdot \left\{ \left[ \frac{\sum_{k=1}^{6} \hat{I}_k e^{-\beta r_k^2} \cos(k\frac{\pi}{3})}{\sum_{k=0}^{6} \hat{I}_k e^{-\beta r_k^2}} \right]^2 + \left[ \frac{\sum_{k=1}^{6} \hat{I}_k e^{-\beta r_k^2} \sin(k\frac{\pi}{3})}{\sum_{k=0}^{6} \hat{I}_k e^{-\beta r_k^2}} \right]^2 \right\}^{1/2}$$

The coefficient r in equation (II.C.5) can be taken as the one-sigma value of the Gaussian response profile of each sensor.

Figure 7A:
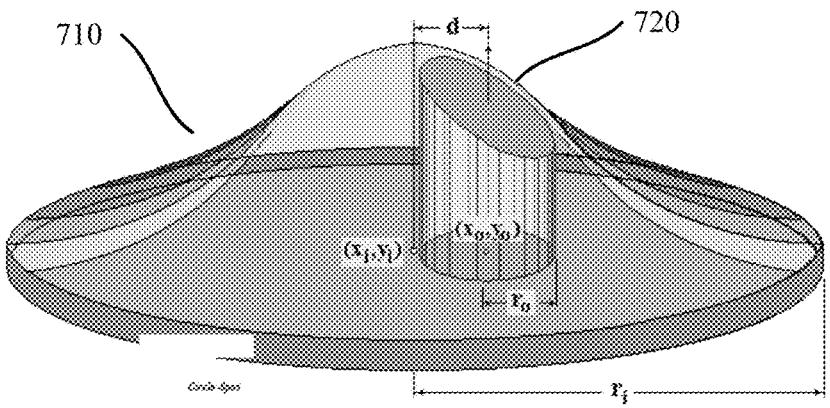
FIGS. 7A, 7B and 7C shows the geometric parameters used in an analysis of an orthogonal decomposition method, according to an embodiment.

For larger area of an image light spot, the sensor signal is the response corresponding to the integral, over the spot's cross-sectional area, of the Gaussian profile. This is described next with the help of FIG. 7A. In FIG. 7A an image feature light spot of radius $r_0$ is at location $(x_0, y_0)$ of the ommatidium, over a sensor with a Gaussian response profile 710. The center line of the image light spot is at a distance d from the ith-sensor's center located at $(x_i, y_i)$ relative to the ommatidium reference frame.

The sensor response can now be computed as the integral of the Gaussian profile over the region R over the sensor surface 720 that the light spot covers. Thus, for the ith-sensor, $$S_i = \int\int_R \eta(\lambda) \hat{I}_i e^{-\beta r_k^2} ds, \; i = 0, 1, \ldots, 6 \qquad \text{(II.C.6)}$$

Figure 7B:
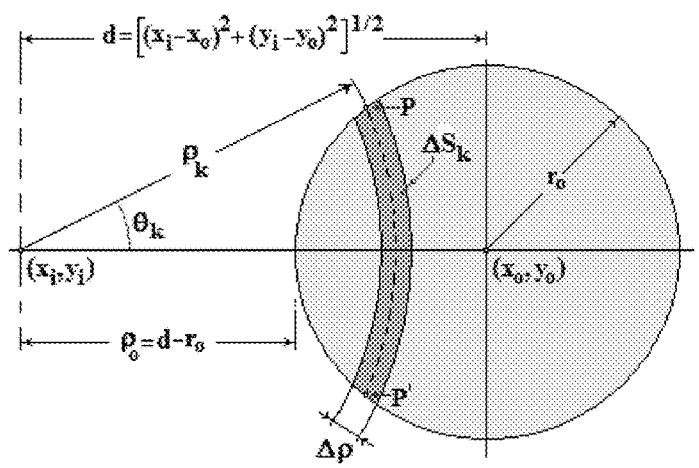
Figure 7C:
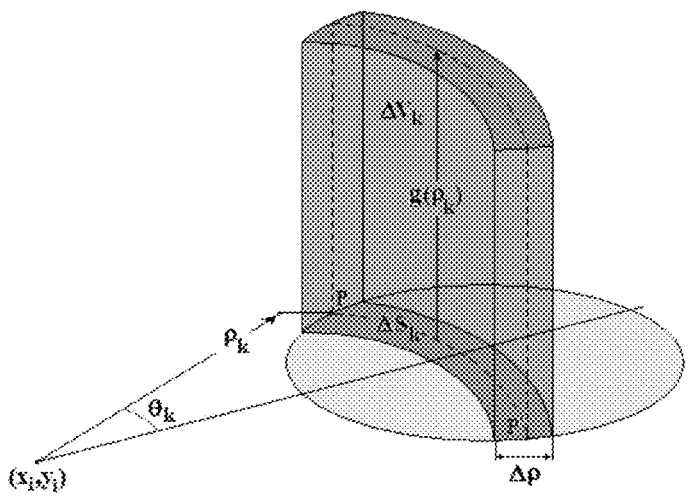

The integration region R consists of the circle defined by the image light spot of radius $r_0$. The integration of the sensor's Gaussian response profile is obtained by Riemann sums. That is, the sum of the products of the sensor Gaussian value $g(\rho_k)$ at distance $\rho_k$ with respect to the ith-sensor center $(x_i, y_i)$, times the annular region areas $\Delta S_k$ over the light-spot region R. A three-dimensional depiction of the annular slices used for the numerical integration is depicted in the following FIG. 7C.

The integration is carried over by summing up the individual products of the sensor response (Gaussian profile) at distance $\rho_k$ from the sensor's center and the surface area $\Delta S_k$ of the annular strip of width $\Delta \rho_k$ bounded by the light spot circle. The distance between the center $(x_i, y_i)$ of the sensor and the center $(x_0, y_0)$ of the image light spot is given by d. Letting the arc length of the central fiber of the annular region be $a_k$, the area of the annular strip within the region R of the light-spot is given by $$\Delta S_k = a_k \cdot \Delta \rho = \rho_k \cdot (2\theta_{kc}) \cdot \Delta \rho \qquad \text{(II.C.7)}$$

In (II.C.7), $\theta_{kc}$ is the angle subtended by the radial vector $\rho_k$ when the tip of this vector touches either point P or P' in Figures-3 and 4, where P and P' are the intersections of the central annular sector fiber (dotted line in the annular region in FIGS. 7B and 7C) with the circle boundary. It can be shown from the geometry of the problem, using the law of cosines, that this angle is given by $$\theta_{kc} = \cos^{-1}\left\{ \frac{\rho_k^2 + d^2 - r_0^2}{2\rho_k d} \right\} \qquad \text{(II.C.8)}$$

The product of the Gaussian value $g(\rho_k)$ and the annular region area $\Delta S_k$ is the "volume" $V_k$ given by $$V_k = g(\rho_k) \cdot \Delta S_k \qquad \text{(II.C.9)}$$

Substituting (II.C.7) into (II.C.9) yields $$V_k = g(\rho_k) \cdot \rho_k \cdot (2\theta_{kc}) \cdot \Delta \rho. \qquad \text{(II.C.10)}$$

Summing all these and replacing (II.C.8) into (II.C.10) gives $$V = 2 \cdot \sum_{k=0}^{n} g(\rho_k) \cdot \cos^{-1}\left\{ \frac{\rho_k^2 + d^2 - r_0^2}{2\rho_k d} \right\} \cdot \rho_k \cdot \Delta \rho \qquad \text{(II.C.11)}$$

The sum extends to all annular strips that fit in the region R from $\rho_k = \rho_0 = d - r_0$ to $\rho_k = \rho_n = d + r_0$. The number n of annular strips between these limits is controlled by the width $\Delta \rho$ of the annular strips that is selected for accuracy considerations. That is, the number of strips and the strip width are related as $$\Delta \rho = \frac{2 \cdot r_0}{n}, n \in Z^+ \qquad \text{(II.C.12)}$$

Substituting (II.C.12) and the normalized Gaussian response function $$g(\rho_k) = \frac{1}{2\pi\sigma^2} \cdot \exp\left\{ -\frac{\rho_k^2}{2\sigma^2} \right\} \qquad \text{(II.C.13)}$$

into (II.C.11) yields $$V = \qquad \text{(II.C.14)}$$

$$2 \cdot \sum_{k=0}^{n} \frac{1}{2\pi\sigma^2} \cdot \exp\left\{ -\frac{\rho_k^2}{2\sigma^2} \right\} \cdot \cos^{-1}\left\{ \frac{\rho_k^2 + d^2 - r_0^2}{2\rho_k d} \right\} \cdot \rho_k \cdot \frac{2 \cdot r_0}{n}$$

Substituting $$\rho_k = d - r_0 + (k-1) \cdot \Delta \rho + \frac{\Delta \rho}{2}$$

into (II.C.14) and performing simplifications gives $$V = \frac{2 \cdot r_0}{n \cdot \pi \cdot \sigma^2} \cdot \qquad \text{(II.C.15)}$$

$$\sum_{k=0}^{n} \exp\left\{ -\frac{\rho_k^2}{2\sigma^2} \right\} \cdot \begin{pmatrix} d - r_0 + \\ (k-1) \cdot \\ \Delta \rho + \frac{\Delta \rho}{2} \end{pmatrix} \cdot \cos^{-1}\left\{ \frac{\rho_k^2 + d^2 - r_0^2}{2\rho_k d} \right\}$$

This Riemann sum can be computed numerically in simulation software.

Figure 8:
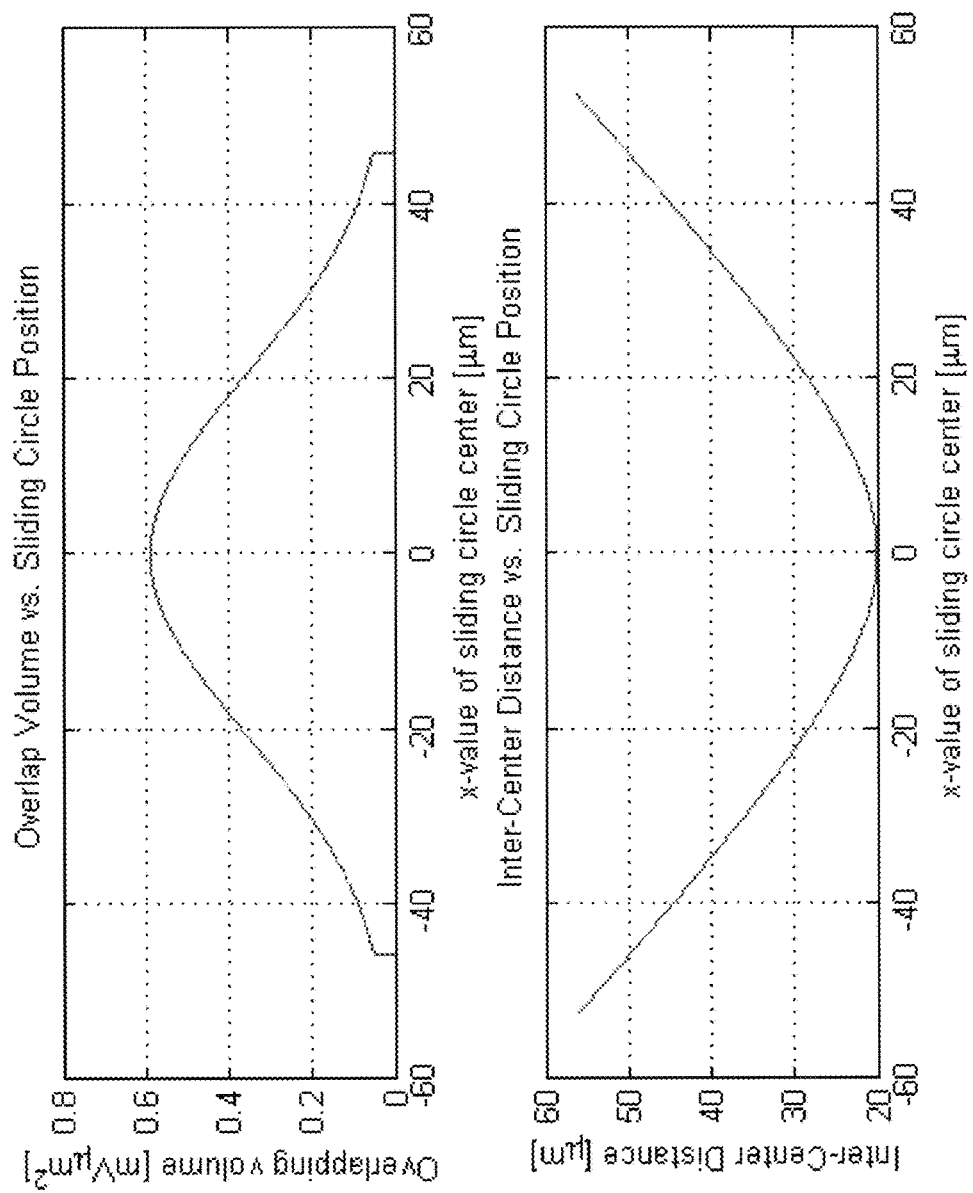
FIG. 8 shows graphs related to a sensor output during traversal of an optical sensor by an object image, according to embodiments.

Referring now to FIG. 8, the top trace shows the overlap volume (mathematical convolution) of a circle shaped target (as in FIG. 7A) moving across the Gaussian Response profile of a photo sensor and the resulting signal output of that circle moving across the equator of that portion of the focal plane of the ommatidia. The bottom trace shows the percentage overlap of that same circular shaped target with adjacent photo sensors whose Gaussian response overlaps with the sensor where the target is transiting an equatorial line.

The orthogonal decomposition method can be adapted to ommatidia with other configurations.

D. Tracking and Trajectory Determinations

This section describes systems and methods for continuous and analog tracking of the position, velocity and acceleration of an image feature using real time parallel analog processing of orthogonally decomposed ommatidium sensor outputs into continuous signals representing the radial distance and incident angle relative to the ommatidium reference axes of an image feature traversing the ommatidium's field of view and the temporal derivatives of these position signals to provide continuous velocity and acceleration signals of the image feature.

Further analog processing of the orthogonal signals U and V enables the determination and continuous tracking of the radial distance ($\rho$) and the radial angle ($\varphi$) of an image feature relative to the ommatidium reference which is the center of the central sensor ($R_0$) in the ommatidium using analog circuitry (see FIG. 8). Temporal derivatives of $\rho$ and $\varphi$ signals can provide both velocity and acceleration of the object on a real time continuous basis.

The methods and systems will be described for the particular embodiment of the seven sensor hexagonal ommatidium configuration, but it will be clear to one skill in the art that the methods and systems can be adapted for other configurations. The values of U, V, $\rho$ and $\varphi$ and their temporal derivatives may also be obtained by digitizing the ommatidium's analog sensor outputs and numerically computing these values so the embodiments also cover this approach too, as would be apparent to one of skill in the art. The derivatives may also be obtained by sampling the ommatidium's output at discrete time instants.

Figure 9:
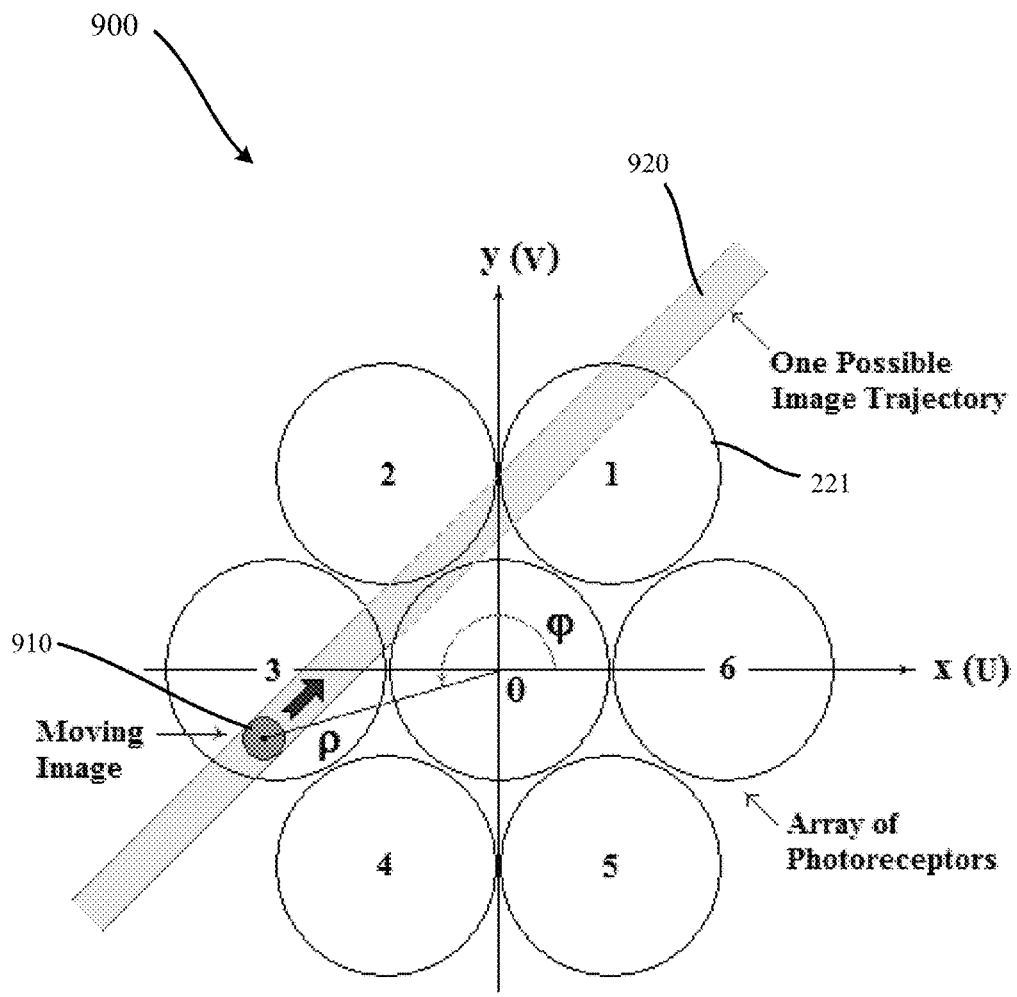
FIG. 9 shows the geometry used for analyzing a trajectory of a moving object's image, according to embodiments.

FIG. 9 shows the seven sensor hexagonal ommatidium configuration 900, on which an image feature 910 is moving in time across various sensors of ommatidia along the trajectory 920. The image feature is presumed initially to be smaller than an individual sensor 221. The U and V outputs determine the radial distance ($\rho$) and the radial angle ($\varphi$) in real time.

Figure 10:
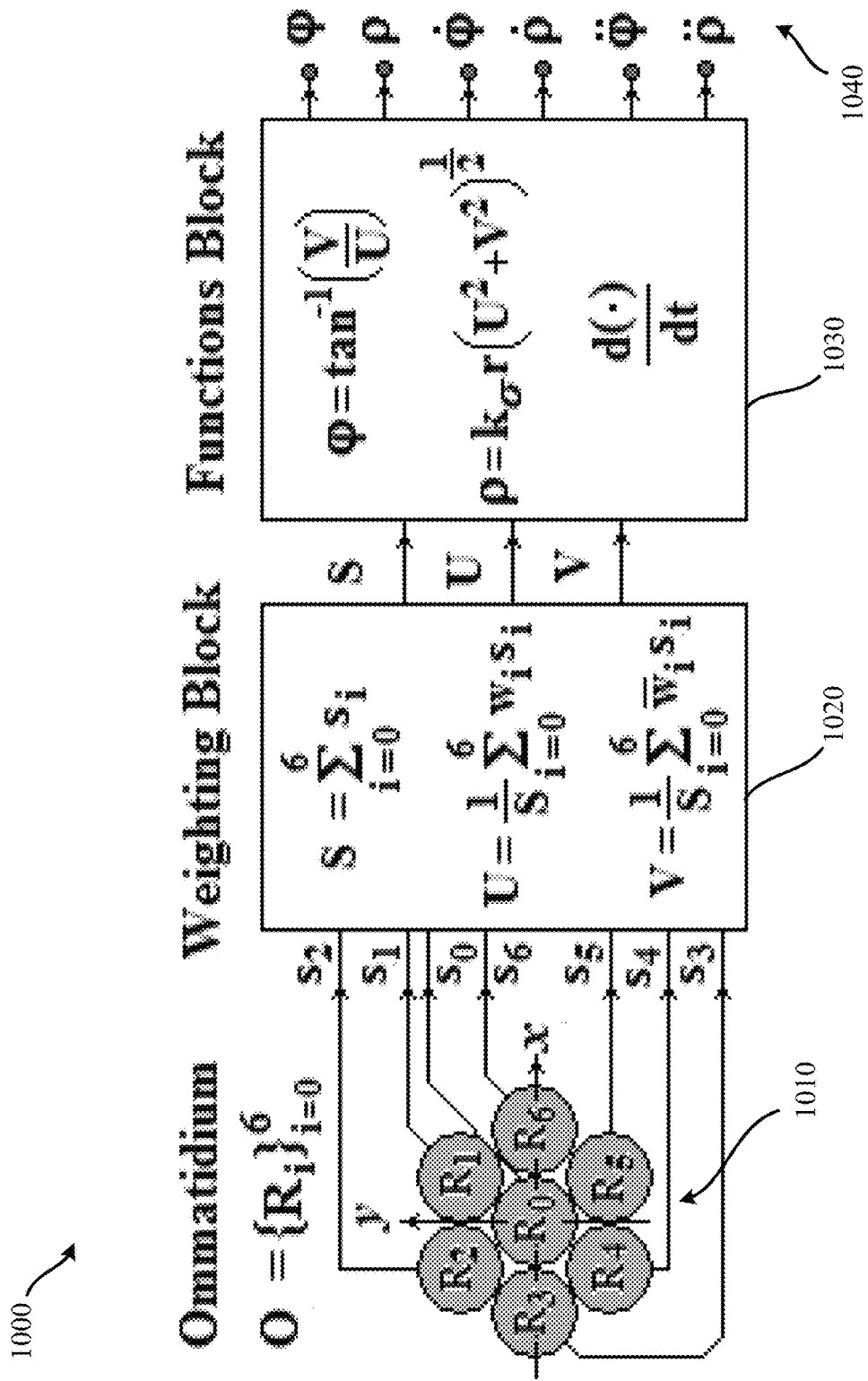
FIG. 10 shows a functional block diagram of operations used to track a moving object image, according to embodiments.

FIG. 10 depicts a functional block diagram 1000 for an ommatidium O 1010 comprising seven sensors $R_i$, as shown. The sensor outputs $s_i$, i=0, 1, . . . , 6 are weighted in the Weighting Block 1020 to produce the real (U) and imaginary (V) orthogonal components and the sum S of all the sensor signals. U and V signals are subsequently processed by analog circuitry in the Functions Block 1030 to produce $\rho$ and $\varphi$ of the image feature spot relative to the center of the ommatidium in polar coordinates, and also produce the corresponding first and second derivatives to yield velocity and acceleration of the image feature spot.

This orthogonal decomposition enables the determination of the angle $\varphi$ and radial distance $\rho$ of an image feature traversing the ommatidium where $\rho$ is, $\rho = k_o \cdot r \cdot \sqrt{U^2 + V^2}$ where r is the sensor radius. The angle $\varphi$ is determined by U and V, by the formula $$\varphi = \tan^{-1} \frac{V}{U}.$$

Thus, with real-time analog processing, from the two continuous signals U and V the image feature position within the ommatidium is specified.

Figure 11:
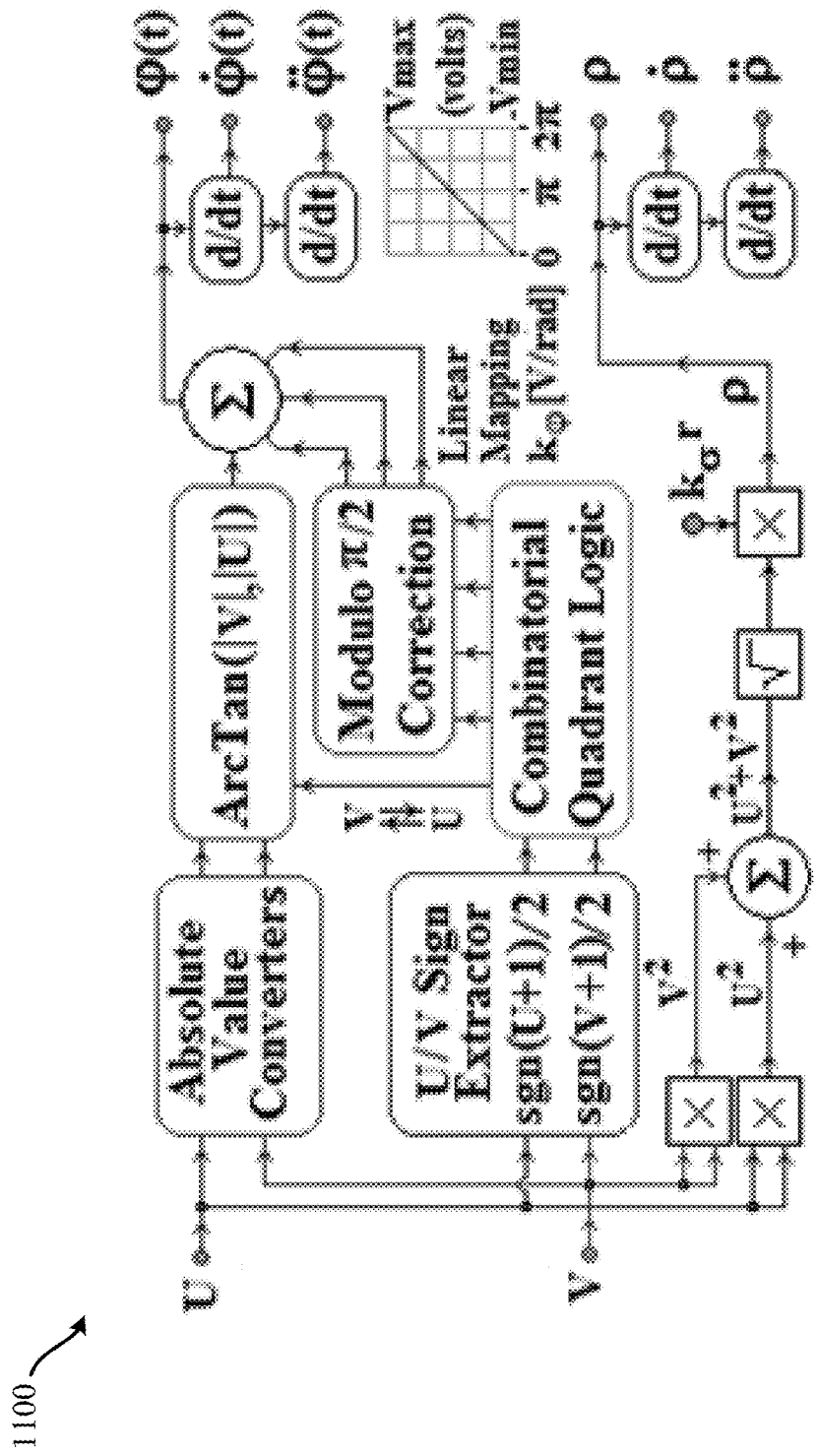
FIG. 11 shows a component level block diagram of operations used to track a moving object image, according to embodiments.

FIG. 11 shows a component level block diagram for computing the first and second derivative values of $\rho$ and $\varphi$ from the U and V inputs. The speed of the computation is only limited by the speed of the circuit components, and not by a sampling speed.

Figure 12A:
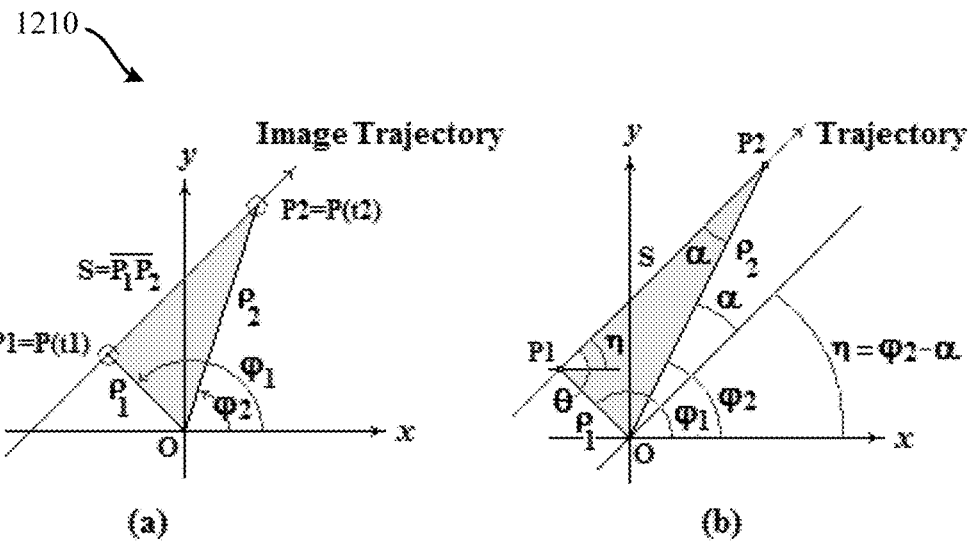
FIGS. 12A and 12B show the geometry used for determining a trajectory of a moving object image, according to embodiments.
Figure 12B:
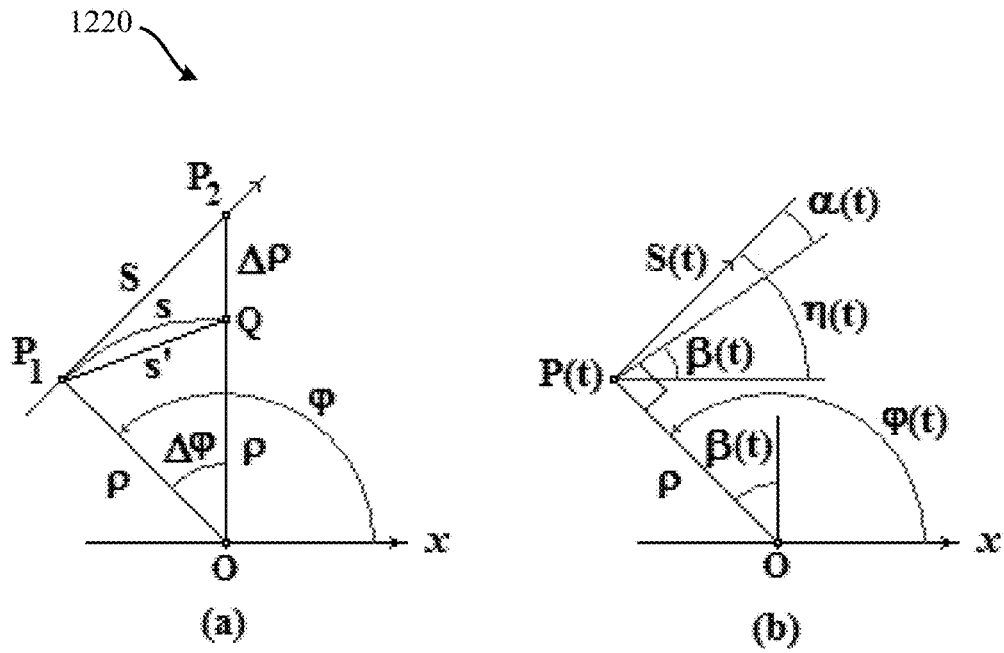

Referring now to FIG. 12A and FIG. 12B, a trajectory is shown of an image feature smaller than an individual detector traversing the ommatidium. FIG. 12A illustrates the geometry used for determining a trajectory of the image feature by first methods based on two observations of $\varphi$ and $\rho$ at different time instants. FIG. 12B illustrates the geometry used for determining a trajectory of the image feature by second method based on continuous observations of $\varphi$ and $\rho$.

There are two methods indicated in FIG. 12A for discrete sample determinations of the derivatives of $\varphi$ and $\rho$. First, shown as (a) in FIG. 12A, is based on two observations, ($\varphi_1, \rho_1$) and ($\varphi_2, \rho_2$), made by the system at two different times, $t_1$ and $t_2$, respectively, as the image feature traverses the array. Denoting the points observed by $P_1=P(t_1)$ and $P_2=P(t_2)$, the trajectory displacement S and angle $\eta$ relative to the array reference line or x-axis are determined from $$S=[\rho_1^2+\rho_2^2-2\rho_1\rho_2 \cos(\varphi_2-\varphi_i)]^{1/2}, \quad \text{(II.D.1)}$$

and $$\eta = \varphi_2 - \arcsin\left\{\frac{\rho_1}{S} \sin(\varphi_2 - \varphi_1)\right\}. \quad \text{(II.D.2)}$$

Equation (II.D.1) is obtained by straightforward application of the law of cosines, while (II.D.2) is obtained by applying the law of sines as follows:

$$\frac{\sin(\varphi_2 - \varphi_2)}{S} = \frac{\sin(\theta)}{\rho_2} = \frac{\sin(\alpha)}{\rho_1}, \quad \text{(II.D.3)}$$

from which $$\alpha = \arcsin\left\{\frac{\rho_1}{S} \sin(\varphi_2 - \varphi_1)\right\}. \quad \text{(II.D.4)}$$

From FIG. 12A (b), the trajectory angle $\eta$ is obtained as $\eta = \varphi_2 - \alpha$, which is equation (II.D.4).

An alternative method to determine the trajectory from the two ($\varphi$, $\rho$) data values is as follows: if $$a=\rho_2 \cos(\varphi_2)-\rho_1 \cos(\varphi_1), b=\rho_2 \sin(\varphi_2)-\rho_1 \sin(\varphi_1) \quad \text{(II.D.5)}$$

then $$S = (a^2 + b^2)^{1/2}, \quad \text{(II.D.6)}$$

$$\eta = \arctan\left(\frac{b}{a}\right)$$

This method appears to be simpler to implement as it does not require inverse trigonometric functions as in the Discrete Method-1. Implementation of these two methods can be achieved using analog circuitry employing of a time-delay line, or digitally from two ($\varphi$, $\rho$) samples.

Referring to FIG. 12B for a continuous signal approach, deriving the trajectory is based on calculus. Starting with the exaggerated angle subtended between the two points $P_1=P$ ($t_1$) and $P_2=P(t_2)$, in FIG. 12B, one can make the following limiting observations. First, the arc s is obtained as $s=\rho\Delta\omega$. Relating to FIG. 12A for the discrete case, here one has $\rho_1=\rho$ and $\rho_2=\rho+\Delta\rho$. Second, as $t_2-t_1\to dt$, the following happens: $\Delta\rho\to d\rho$ so that $\rho_2\to\rho_1=\rho$, $s\to ds\approx ds'$ (that is, the arc approaches the secant), $\Delta\varphi\to d\varphi$, the angle $\angle P_1QP_2\to\pi/2$, and $S\to dS$. Therefore, for an infinitesimal time interval dt, one has $$dS\approx(ds^2+d\rho^2)^{1/2}=[(\rho d\varphi)^2+d\rho^2]^{1/2}, \quad (\text{II.D.7})$$

from which $$\frac{dS}{dt}=\dot{S}\approx\frac{\rho^2 d\varphi\frac{d\varphi}{dt}+d\rho\frac{d\rho}{dt}}{[\rho^2 d\varphi^2+d\rho^2]^{1/2}}=\frac{\rho d\varphi\frac{d\varphi}{dt}+\frac{d\rho}{\rho}\frac{d\rho}{dt}}{\left[d\varphi^2+\left(\frac{d\rho}{\rho}\right)^2\right]^{1/2}}. \quad (\text{II.D.8})$$

Since for most cases $(d\rho/\varphi^2\approx 0)$, then (II.D.8) can be written as $$\frac{dS}{dt}=\dot{S}\approx\frac{\rho^2 d\varphi\frac{d\varphi}{dt}+d\rho\frac{d\rho}{dt}}{d\varphi}=\rho\frac{d\varphi}{dt}+\frac{1}{\rho}\frac{d\rho}{d\varphi}\frac{d\rho}{dt}. \quad (\text{II.D.9})$$

One can write $$\frac{d\rho}{d\varphi}=\frac{\frac{d\rho}{dt}}{\frac{d\varphi}{dt}}, \text{ so} \quad (\text{II.D.9})$$

becomes $$\frac{dS}{dt}=\dot{S}\approx\rho\frac{d\varphi}{dt}+\frac{1}{\rho\left(\frac{d\varphi}{dt}\right)}\left(\frac{d\rho}{dt}\right)^2. \quad (\text{II.D.10})$$

It can be shown that all the time-derivatives in (II.D.10) can be obtained from the time derivatives of U and V, that is, from dU/dt and dV/dt, which are given by $$\varphi=\arctan\left(\frac{V}{U}\right)\Rightarrow\frac{d\varphi}{dt}=\frac{U\frac{dV}{dt}-V\frac{dU}{dt}}{U^2+V^2}. \quad (\text{II.D.11})$$

$$\rho=k_\sigma r(U^2+V^2)^{1/2}\Rightarrow\frac{d\rho}{dt}=k_\sigma r\frac{U\frac{dU}{dt}-V\frac{dV}{dt}}{(U^2+V^2)^{1/2}}. \quad (\text{II.D.12})$$

Substituting (II.D.11) and (II.D.12) into (II.D.10) gives $$\frac{dS}{dt}\approx \quad (\text{II.D.13})$$

$$\rho\cdot\frac{U\frac{dV}{dt}-V\frac{dU}{dt}}{U^2+V^2}+\frac{1}{\rho}\cdot\frac{1}{\frac{U\frac{dV}{dt}-V\frac{dU}{dt}}{U^2+V^2}}\cdot\left(k_\sigma r\frac{U\frac{dU}{dt}+V\frac{dV}{dt}}{(U^2+V^2)^{1/2}}\right)^2.$$

Using $\rho=k_\sigma r(U^2+V^2)^{1/2}$ and after some algebra one obtains $$\frac{dS}{dt}\approx\rho\cdot\left\{\frac{\left(\frac{dU}{dt}\right)^2+\left(\frac{dV}{dt}\right)^2}{U\frac{dV}{dt}-V\frac{dU}{dt}}\right\} \quad (\text{II.D.14})$$

This is the velocity of the image spot over the ommatidium image space. Integration of (II.D.14) over time would give displacement, and the derivative of (II.D.14) with respect to time would give the acceleration. These can be achieved using an integrator and a differentiator components in an analog circuit.

The angle $\eta(t)$ of the instantaneous trajectory shown in FIG. 12B (b) is obtained as follows:

$$\alpha=\arctan\left(\frac{d\rho}{ds}\right)=\arctan\left(\frac{\frac{d\rho}{dt}}{\frac{ds}{dt}}\right)=\arctan\left(\frac{\frac{d\rho}{dt}}{\rho\frac{d\varphi}{dt}}\right) \quad (\text{II.D.15})$$

Substituting (II.D.11) and (II.D.12) into (II.D.15) and using $$\eta=\alpha+\varphi-\frac{\pi}{2}$$

yields $$\eta(t)=\arctan\left(\frac{U\frac{dU}{dt}+V\frac{dV}{dt}}{U\frac{dV}{dt}-V\frac{dU}{dt}}\right)+\varphi-\frac{\pi}{2} \quad (\text{II.D.16})$$

Figure 13:
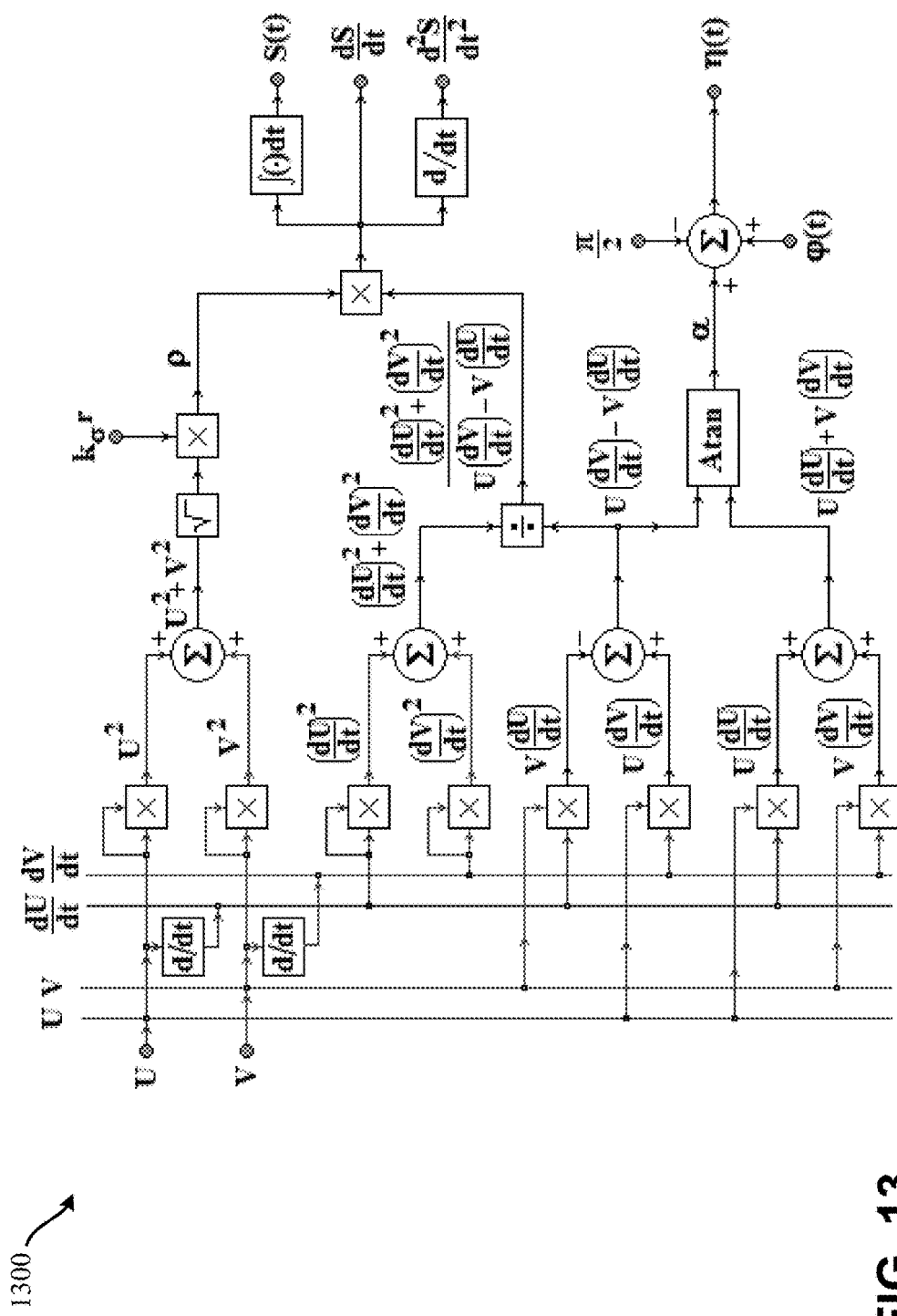
FIG. 13 shows an component level block diagram of operations used to track a moving object image, according to embodiments.

FIG. 13 shows a block diagram of a circuit for obtaining the outputs of equations (II.D.14) and (II.D.16). When so implemented, the trajectory of the image feature can be calculated in real time.

E. Dynamic Contrast Control

This section describes embodiments for systems and methods for real-time tracking of an image feature with respect to the background and automatically adjusting to contrast reversals between an image feature and background. Such systems and methods can be used, for example, when an ommatidium-based system is imaging or tracking a dark object across a bright sky. Light sensors of the ommatidium can then have the bright sky background imaged onto most of their surfaces, with only a relatively small dark image feature on the sensor. As some previous embodiments presume a bright object image and dark background, a potential problem or inaccuracy can be prevented by applying an inversion-biasing to the output signals of the sensors.

Figure 14:
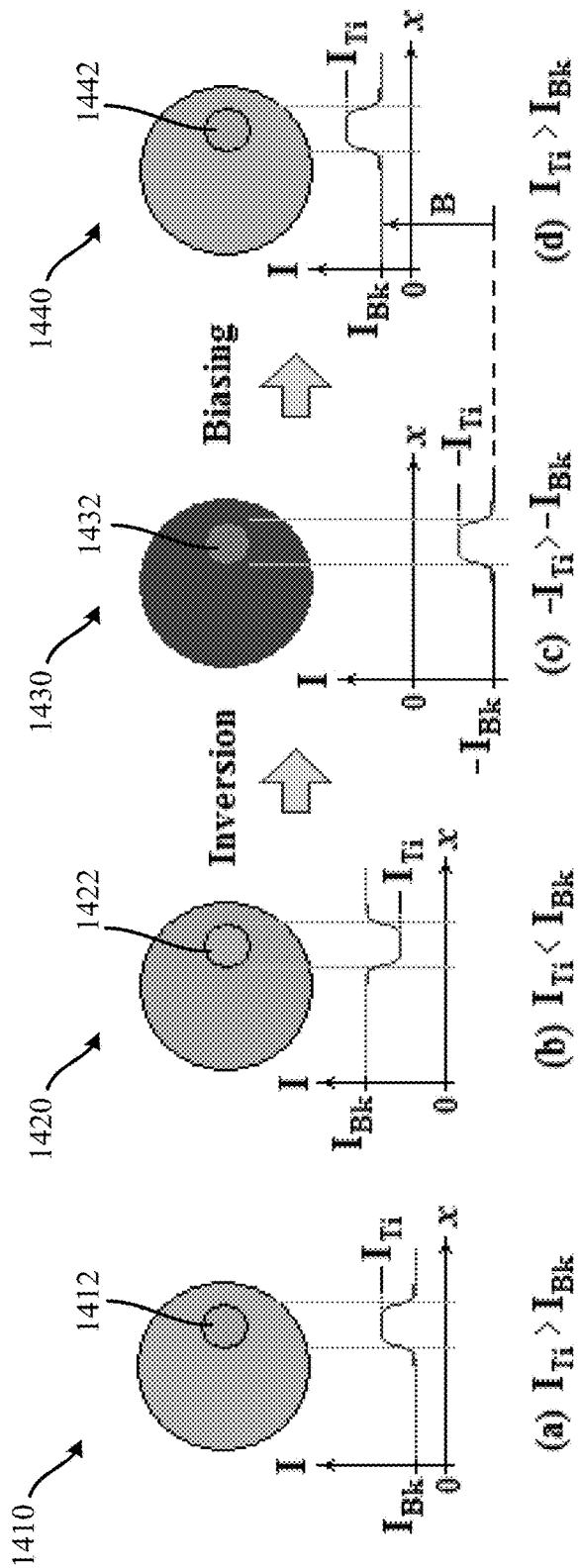
FIG. 14 shows a process of dynamic contrast inversion, according to embodiments.
Figure 15:
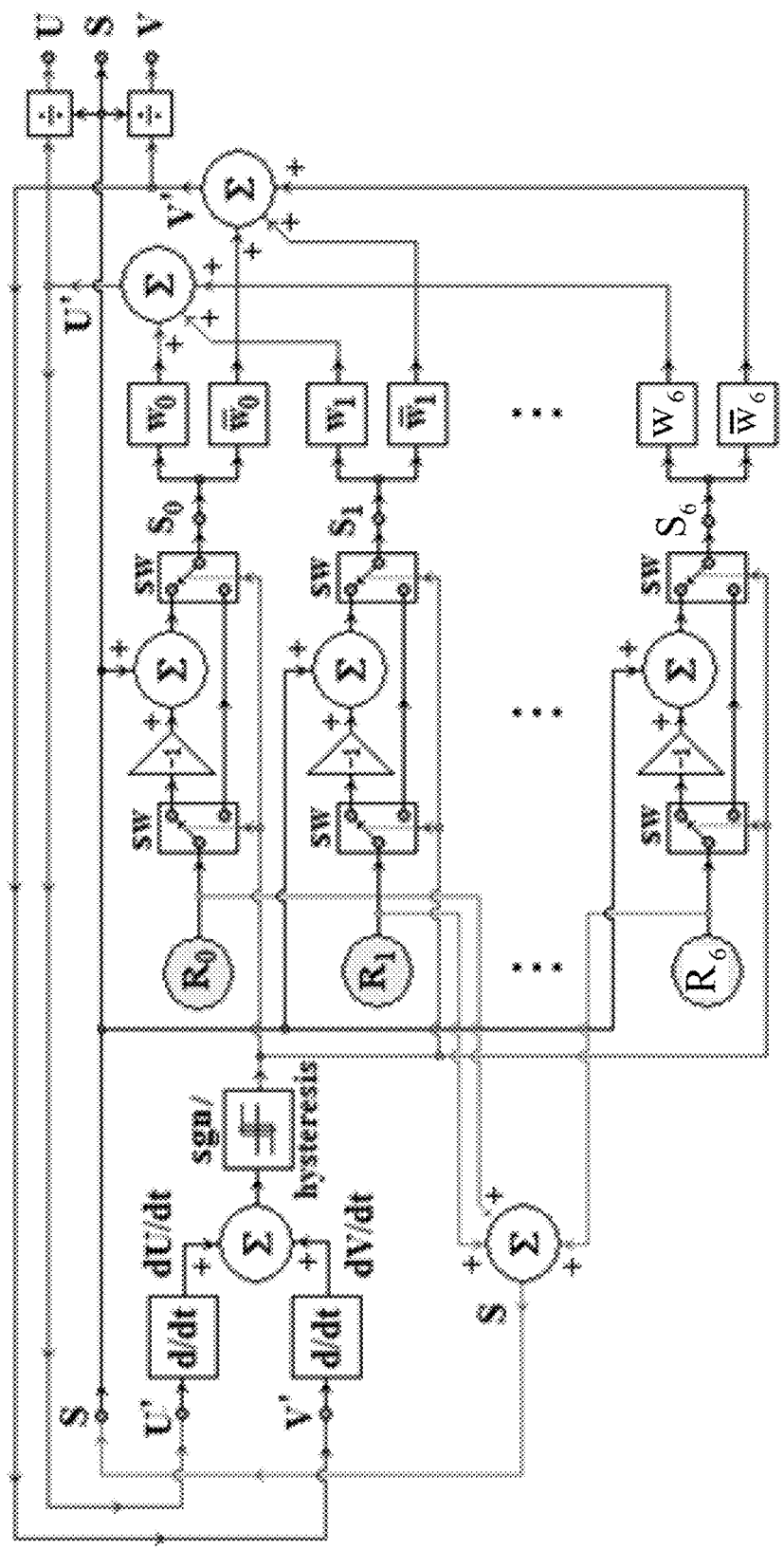
FIG. 15 shows a component level block diagram of operations used to implement dynamic contrast inversion, according to embodiments.

The theory of operation for dynamic contrast reversal can be understood with reference to FIG. 14 and FIG. 15. In the case of orthogonal decomposition methods and systems, tracking objects regardless of whether lighter or darker than the ambient background, may be based on differentiating the U, V, and/or S-signals and by checking the sign, (+) or (−), of the differentiators' response signals. The sign can then trigger a command to another section of the circuit that applies the inversion-biasing mechanism, or to revert to the normal operation (i.e., a bright object against a dark background). While the image feature changes brightness relative to the background as it traverses the array, the differentiators and sign detectors will enable or disable the inversion-biasing algorithm automatically so that the tracking continues using the appropriate tracking mode.

FIG. 14 shows combinations that are possible between the object image feature and the background:

| Image-Background Combinations | Differentiators Signal Levels & Output Signs |
|---|---|
| Bright Image (BI), Dark Background (DB) ... | (BI) > (DB) => (+) |
| Bright Image (BI), Bright Background (BB) ... | (BI) > (BB) => (+) or (BI) < (BB) => (−) |
| Dark Image (DI), Dark background (DB) ... | (DI) > (DB) => (+) or (DI) < (DB) => (−) |
| Dark Image (DI), Bright Background (BB) ... | (DI) < (BB) => (−) |

The first case is shown in 1410, in which the image feature 1412 is brighter than the background on the sensor. The graph for 1410 shows a cross section of the sensor response I. The sensor outputs due to the background $I_{Bk}$ and the "target image" $I_{Ti}$ satisfy $I_{Bk} < I_{Ti}$. Thereafter, in the third case 1420 in which the image feature 1422 is darker than the background $I_{Bk} > I_{Ti}$. The detection scheme will automatically switch between one mode (normal) or the other mode (inversion and biasing) according to the relative intensities between the object image feature and the background, as the object image feature traverses the ommatidium field of view. When the situation of 1420 is detected, the detection scheme applies inversion 1430 so that the image feature 1432 is brighter than the background, and follows this with biasing 1440 so that both outputs are now positive and the image feature 1442 is now brighter than the background.

FIG. 15 shows an embodiment of a functional block diagram of a circuit that can implement the dynamic contrast reversal. The particular embodiment shown applies to the case of U/V/S signals obtained using an orthogonal decomposition method to the seven sensor hexagonal ommatidium structure shown in FIG. 2B. The differentiators activate a switch to enable or disable the following inversion-and-biasing components for continual tracking of the object image feature.

F. Combined Methods and Systems

This section describes methods and systems that combine previously described methods and systems of locating or tracking an image feature of an object in a single ommatidium. Combining the differencing methods described in section II.B with the orthogonal decomposition methods of section II.C can produce improved accuracy in position, velocity and acceleration determinations.

There are several analytical advantages gained by expressing the orthogonal and differencing methods in compact form using matrix-vector notation besides clarity and notational economy. In what follows, $\overline{\theta}_\perp(\eta_k)$ refers to the orthogonal system using Lagrange's planar hexagonal packing index and number $\eta_h$, and $\overline{\theta}_\Delta(T_2)$ refers to the differencing method for the triangular number $T_2$ structure embedded in $\eta_h$ and $T_n$ for n>2, i.e., $T_2 \subset \eta_h$. This allows the implementation of zooming algorithms $Z_n^{+1}$ for both systems, as will be described below in section III.C. Another advantage is the possibility of generation of a multiplicity of mathematically-derived systems from these two basic ones by inversion, complementation, by dual spaces, by application of bilinear transformations, etc.

The orthogonal system is described here by using complex exponential notation. For the differencing method, $T_2$ is defined to be the distance between sensor centers for any $T_n$ system besides the structure it refers to.

For the orthogonal decomposition system, denoted $\overline{\theta}_\perp(\eta_k)$, one has $$\overline{\vartheta}_\perp(\eta_h) = \begin{bmatrix} \rho \\ \varphi \end{bmatrix} = \begin{bmatrix} |\overline{S}^T \tilde{E}| \\ \angle(\overline{S}^T \tilde{E}) \end{bmatrix}, \quad \text{(II.F.1)}$$

where $\overline{S} = \overline{S}(t) = [s_i(t)]$, $\tilde{E} = [\exp\{j\overline{\Theta}\}]$, $\overline{\Theta} = [\theta_i(\eta_h)]$,
$U = \Re e\{\overline{S}^T \tilde{E}\}$, $V = \Im m\{\overline{S}^T \tilde{E}\}$, and $\Sigma = \|\overline{S}\|_1$ For the differencing system, denoted $\vartheta_\Delta(T_2)$, one has $$\vartheta_\Delta(T_2) = [\overline{p}_k] \quad \text{(II.F.2)}$$

$$\overline{p}_k = \begin{bmatrix} x \\ y \end{bmatrix}_k = \begin{bmatrix} \overline{\eta}^T \\ \overline{\gamma}^T \end{bmatrix}_k \begin{bmatrix} L \\ 1 \end{bmatrix}_k, \quad \text{(II.F.3)}$$

where $\begin{bmatrix} L \\ 1 \end{bmatrix}_k = [\ln(s_0), \ln(s_k), \ln(s_{k+1}), 1]_k^T,$ $\begin{bmatrix} \overline{\eta}^T \\ \overline{\gamma}^T \end{bmatrix}_k = \begin{bmatrix} \eta_{0,k}, \eta_k, \eta_{k+1}, \eta_{d,k} \\ \gamma_{0,k}, \gamma_k, \gamma_{k+1}, \gamma_{d,k} \end{bmatrix}$, and $\eta_{0,k} = -\frac{y_{k+1} - y_k}{\beta\Delta}, \eta_k = \frac{y_{k+1}}{\beta\Delta}, \eta_{k+1} = -\frac{y_k}{\beta\Delta},$ $\eta_{d,k} = \frac{(y_{k+1} - y_k)T_2^2}{\Delta}; y_i = T_2 \sin(\frac{\pi}{3}i)$ $\gamma_{0,k} = \frac{x_{k+1} - x_k}{\beta\Delta}, \gamma_k = -\frac{x_{k+1}}{\beta\Delta}, \gamma_{k+1} = \frac{x_k}{\beta\Delta},$ $\gamma_{d,k} = -\frac{(x_{k+1} - x_k)T_2^2}{\Delta}; x_i = T_2 \cos(\frac{\pi}{3}i)$ for $\beta = 4 \ln(2)/T_2^2$, $\Delta = 2(x_k y_{k+} - x_{k+1} y_k)$.

The methods may be combined using proportional-integral-derivative (PID) methods:

$$\overline{\xi} = \begin{bmatrix} x_{opt} \\ y_{opt} \end{bmatrix} = \underbrace{f(\rho, \varphi, \overline{p}_k)}_{\text{"P"}} + A \cdot \underbrace{\left\{ \int_{:P}^{R} \overline{\vartheta}_\perp(\eta_h) \right\}}_{\text{"I"}} + (1-A) \cdot \underbrace{\{\Gamma \overline{\vartheta}_\Delta(T_2)\}}_{\text{"D"}}, \quad \text{(II.F.4)}$$

where $f(\rho, \varphi, \overline{p}_k)$ is a function of its arguments, being the P part in the PID combining approach, which may include any correction terms, pre-acquisition coordinates as in the case of inter-ommatidia state propagation, etc., and where $$\int_{:P}^{R} \begin{bmatrix} \rho \\ \varphi \end{bmatrix} = \rho \cdot \begin{bmatrix} \cos(\varphi) \\ \sin(\varphi) \end{bmatrix} = \begin{bmatrix} x \\ y \end{bmatrix}$$

represents the polar to rectangular conversion operator, and $$\Gamma = \delta \left\{ \left( \left| \int_{:P}^{R} \overline{\vartheta}_\perp(\eta_h) \right| - |\overline{p}_k| \right) \cdot w \right\} \cdot I_6,$$

wherein $\delta$ is the Dirac delta function, and $\Gamma$ is a diagonal kth-vector Select Matrix.

The matrix $A = w \cdot I_2$ is a 2 by 2 diagonal weight matrix, where $0 \leq w \leq 1$ would be determined on specific tracking criteria and for particular cases. If w is set to 1, then the Orthogonal Decomposition Method would be used exclusively. On the other extreme, if w is set to 0, then the Differencing Method would be used exclusively. Intermediate values of w can be set by different tracking strategies or criteria. For example, if a large object is being observed, then the weight w could be set by the ratio of the object size or angular extent divided by the ommatidia FOV extent. Other criteria may involve contrasts, brightness, object speed, distance from the ommatidia tracking limit or from object's distance from the ommatidia center (where the differencing method will have all the positions converging). One can also set the weight w based on probability measures obtained from the tracking data, from a feedback loop of the tracking platform, or from an optimization tracking algorithm that compares the two methods alternatively by switching the weight w between 0 and 1 and compares the object's trajectory and noise, etc. In summary, the algorithm (s) for determining of the optimal value for the combining weight w would be defined for each specific application. If w is set to zero, then also $F=I_6$ and multiple objects can be tracked simultaneously.

These combined methods and systems can be implemented in analog or digital circuitry, and may provide improved location detection and tracking of one or more independent image features.

III. Multiple Ommatidia Systems and Methods

This section describes methods and systems that use one or more arrays of sensors that have been organized into subarrays, with each subarray acting as a single ommatidium, to perform detection and/or tracking of one or more objects.

A. Multiple Ommatidia Systems

The methods and systems disclosed for a single ommatidia can be applied when the sensor array comprises more than one individual ommatidia. The methods for single ommatidia can be extended and adapted to combine the detection and tracking results of each constituent ommatidium. Characteristics of the object or of multiple objects can be tracked, including size, shape, brightness, relative contrast which is directly related to object detectability, and the rate of the object(s) traversing the field of view of the system.

Figure 16A:
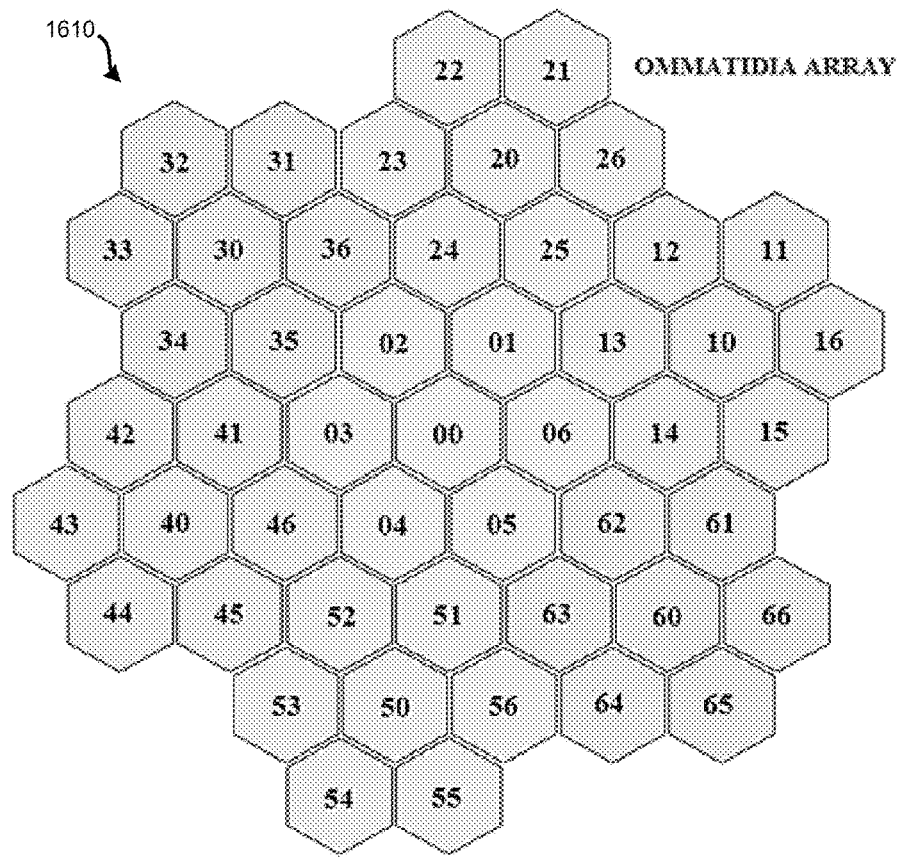
FIGS. 16A, 16B and 16C show configurations of sensors and structures for multi-ommatidia systems and methods, according to embodiments.
Figure 16A:
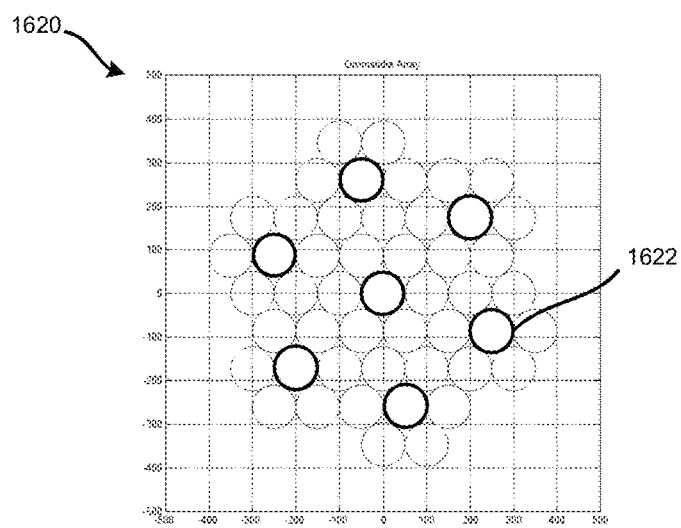
Figure 16B:
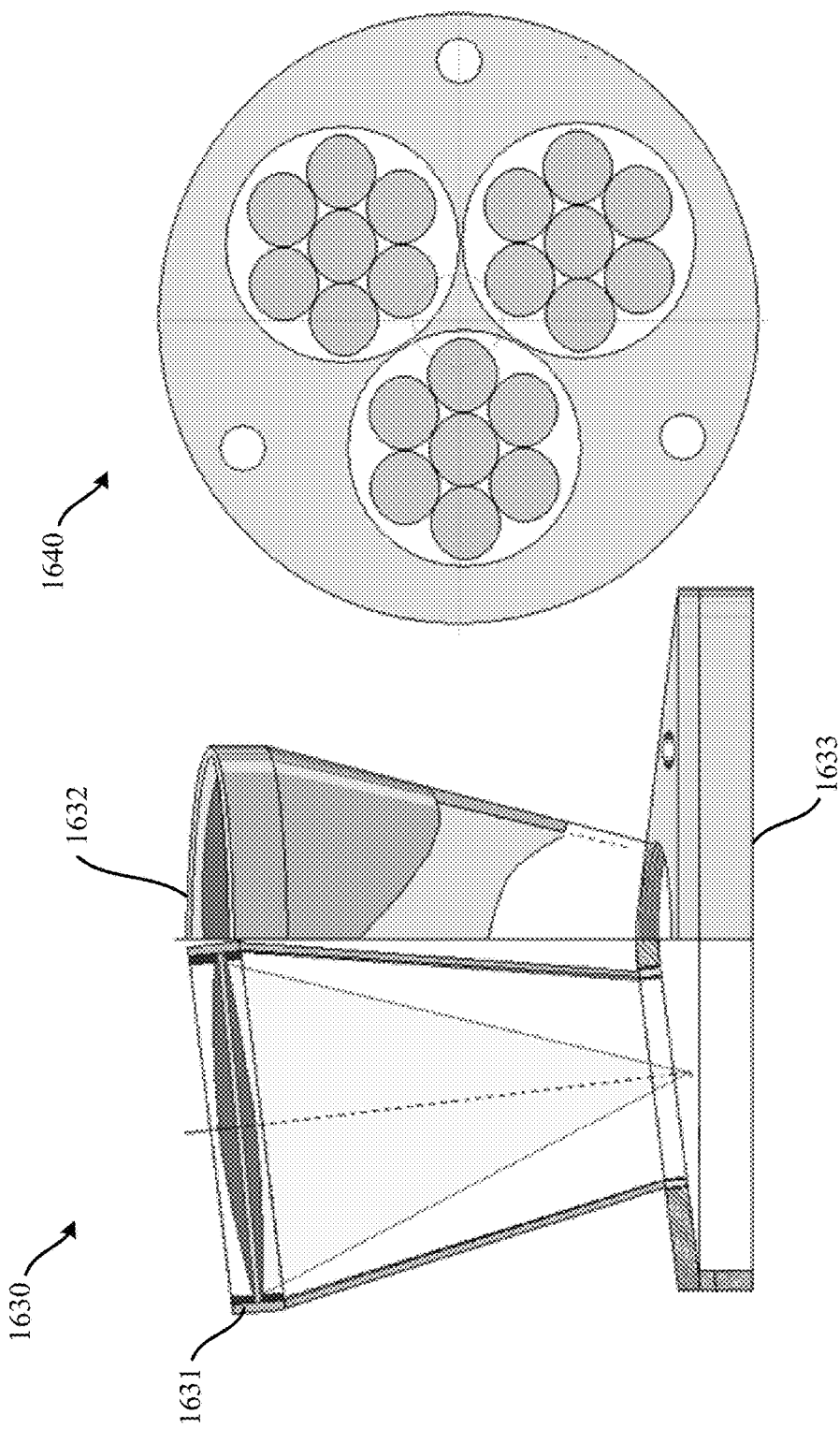

Various embodiments of configurations that combine multiple ommatidia, each comprising multiple sensors, are shown in FIG. 16A, FIG. 16B, and FIG. 16.C, and described in further detail below. These figures show three embodiments: FIG. 16A is a planar arrangement of seven ommatidia under a single focusing lens; FIG. 16. B comprises three ommatidia with independent focusing lenses (one lens per ommatidium); and FIG. 16C shows a particular example of numerous ommatidia arranged over a hemispherical (now a three-dimensional) supporting structure. It will be recognized that the configuration of FIG. 16C is a specific embodiment of embodiments in which the supporting structure is convex hull, or an arbitrary three-dimensional body in general. Each individual, or unit, ommatidium of a multiple ommatidia system may have any one of the configurations shown in FIGS. 2A to 2D, or another configuration of multiple sensors configured to implement hyperacuity.

Methods the can be used in multiple ommatidia systems, such as to determine image feature position, include: orthogonal decomposition methods, differencing methods, or the combination methods described previously. Other methods will be clear to one of skill in the art. The combination orthogonal-differencing methods can use weighted methods, such as by a PID.

FIG. 16A shows a first configuration 1610, which may be implemented as an integrated circuit. Each individual ommatidium has the configuration of the seven sensor hexagonal ommatidium previously described. These individual ommatidium are then themselves configured as six ommatidia hexagonally arranged around a central ommatidium. The counter clockwise numbering of the sensors within each individual ommatidium is given by the second index number; the first index indicates the ommatidium number. The identification of the sensors within each ommatidia arrangement will always be given by ordered pairs (o, s), where o denotes ommatidia number in an array, including a single ommatidium, and s denotes the sensor number within the oth-ommatidia. On each array, the center of the sensor (0, 0) would be taken as the origin of the array, which will be considered as the origin of the global reference frame. Likewise, the center of the sensor (o, 0) for the oth-ommatidia would be considered as the origin of the local reference frame for the particular ommatidia.

A similar alternate configuration 1620 uses circular shaped sensors. The central sensor of each seven sensor hexagonal ommatidium is the indicated with a bold circle.

In FIG. 16B, the embodiment configuration 1630 comprises multiple independent ommatidia 1631 and 1632, each containing its own focusing lens, and put together mechanically on a planar support. In this case the sensors are of different ommatidia are not adjacent, and larger gaps exist between the three shown in this arrangement. The arrangement 1630 can be altered to have the three ommatidia touch each other as three tangent circles 120 degrees apart, as in configuration 1640. An "array center" can be defined for both such configurations.

The configuration 1640 of FIG. 16B can function as a hierarchical version of the configuration shown in FIG. 2C.

Figure 16C:
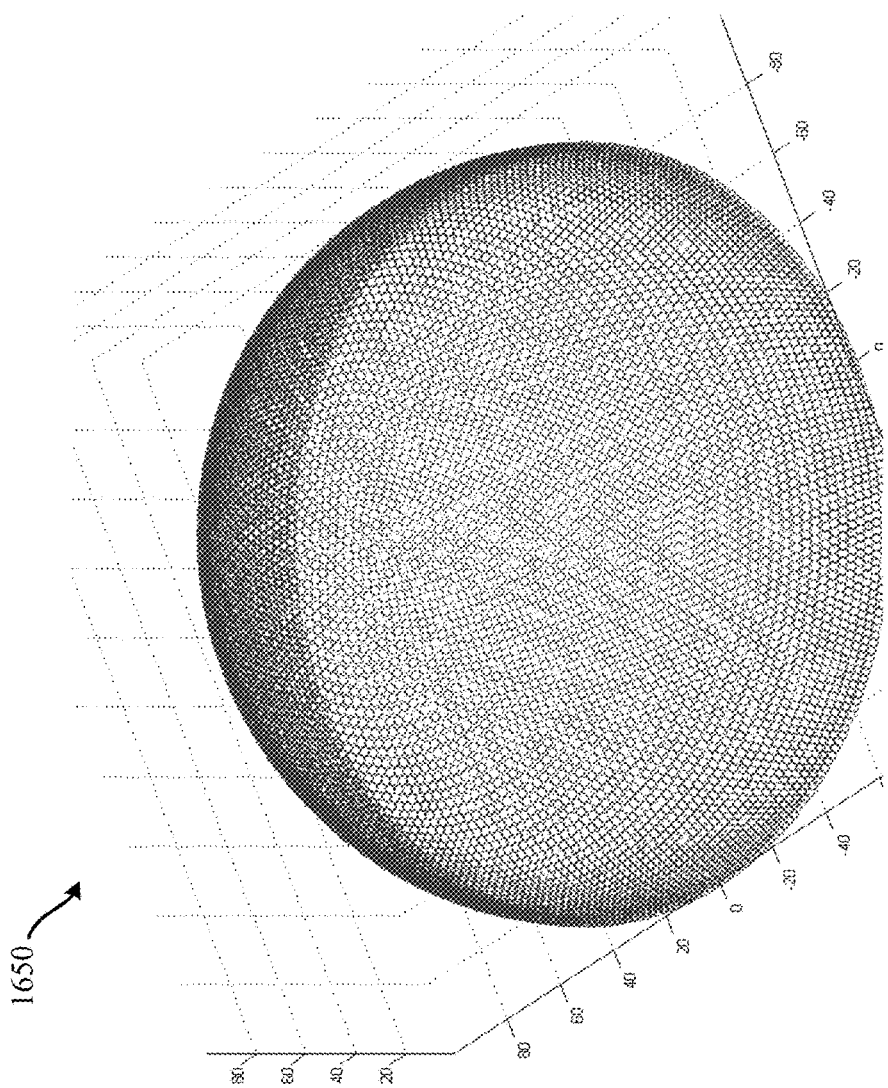

In FIG. 16C, the embodiment configuration 1650 is a 3-D hemispherical arrangement of unit ommatidia. As the other arrangements, a global array center and frame relative to which all the ommatidia observations are referred can also be defined as the center of the sphere the hemisphere. This is described in detail below.

Figure 17A:
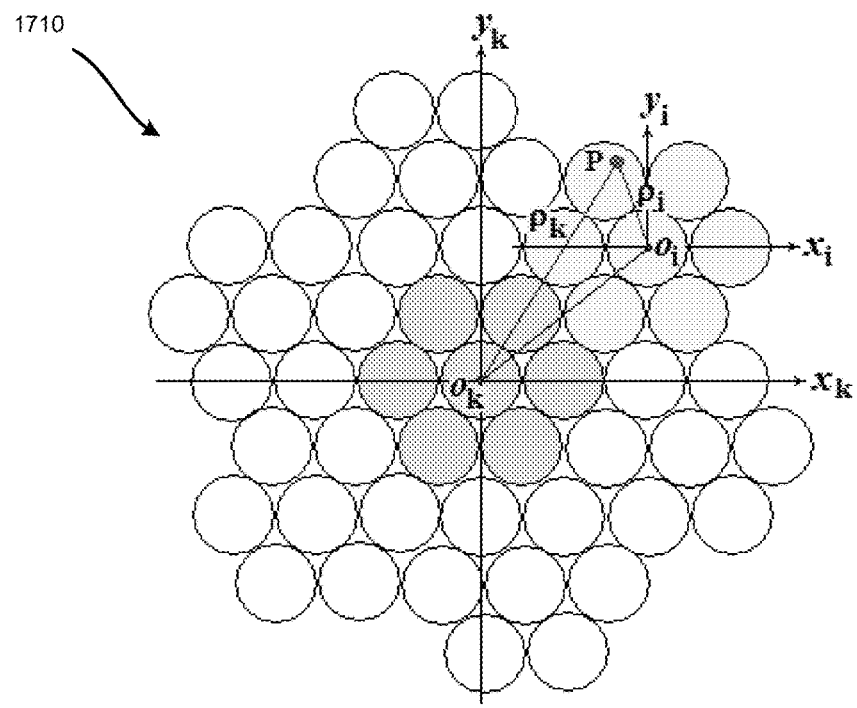

FIG. 17A shows the geometry 1710 used for the methods for the configuration 1620 of FIG. 16A. The centers $(x_i, y_i)$ are given in Table 3 shown in FIG. 17C. Note that the radial distance of the circles containing all the six peripheral unit ommatidia centers is $d\sqrt{7}$, for d the radius of each circular sensor. The numbers are the cosines (for the X-coordinates) and the sines (for the Y-coordinates) of the respective angles $\theta_i$ shown in Column 1 of Table 3. These angles are the ones subtended from the reference line (the positive part of the X-axis) and the reference point (the center of the central ommatidium) to each peripheral unit ommatidia in the arrays shown in FIG. 17A.

Figure 17B:
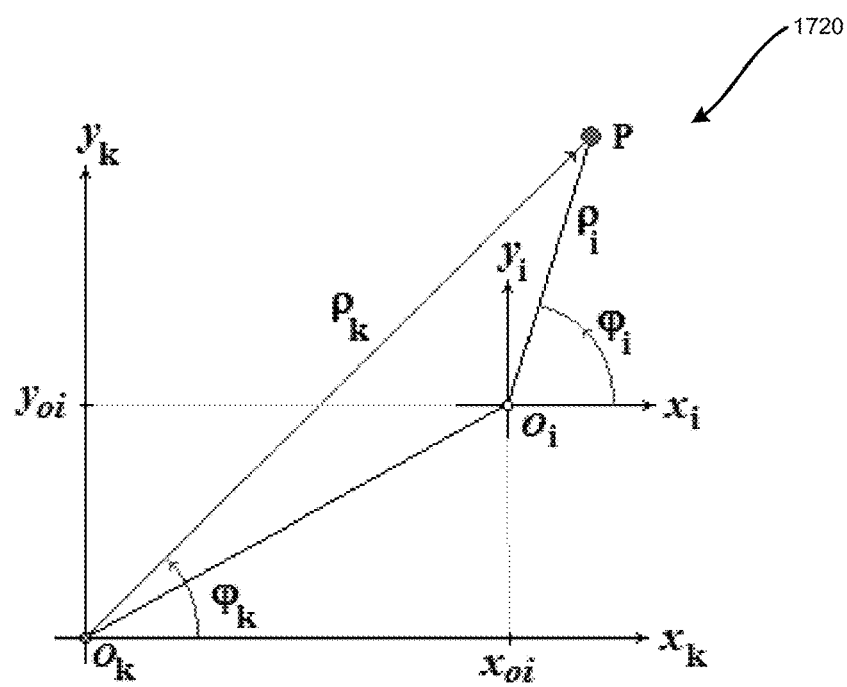

FIG. 17B shows the transformation 1720 or mapping of the position vector from a local unit ommatidium coordinate frame to the global coordinate frame is obtained by the following formulas in polar coordinates:

$$\rho_k = \{[x_{oi} + \rho_i \cos(\varphi_i)]^2 + [y_{oi} + \rho_i \sin(\varphi_i)]^2\}^{1/2} \qquad \text{(III.A.1)}$$

$$\varphi_k = \arctan\left\{\frac{y_{oi} + \rho_i \sin(\varphi_i)}{x_{oi} + \rho_i \cos(\varphi_i)}\right\} \qquad \text{(III.A.2)}$$

A method for the transformation from a local to the global frame can be implemented using the following pseudo-code as follows:

(A) Read the ($x_i$, $y_i$) values from Table 3, or compute using:
  (A.1) $\theta_{01} = \tan^{-1}(\sqrt{3}/2)$
  (A.2) For i=2 to 6
  {
    (A.3) $\theta_{0i} = \theta_{01} + (i-1) \cdot 60$
    (A.4) $x_{0i} = d \cdot \sqrt{7} \cdot \cos(\theta_{0i})$
    (A.5) $y_{0i} = d \cdot \sqrt{7} \cdot \sin(\theta_{0i})$
  }
(B) Read the ommatidium $\rho_i$, $\varphi_i$ values for the actual spot-image location
(C) $a = x_{0i} + \rho_i \cos(\varphi_i)$
(D) $b = y_{0i} + \rho_i \sin(\varphi_i)$
(E) $\rho_k = \sqrt{a^2 + b^2}$
(F) $\theta_k = \tan^{-1}(b/a)$ (Note: This can be accomplished with a version of the arctan function that accounts for the quadrant of (a, b).)

Figure 18:
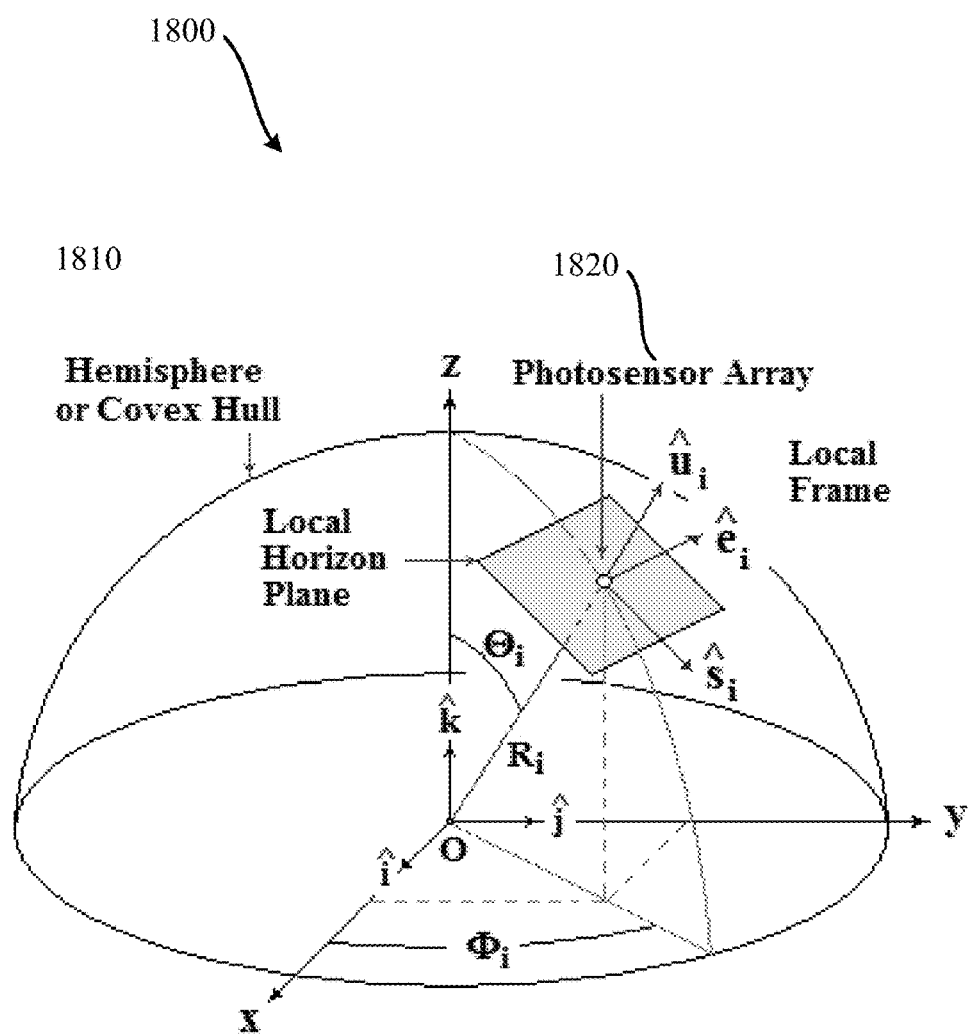
FIG. 18 shows the geometry of a multi-ommatidia system, according to embodiments.

FIG. 18 shows the geometry 1800 for the configuration of multi-ommatidia covering a body, such as shown in FIG. 16C. Once the local ommatidia vectors have been transformed to the global array vectors, the transformation of the $k^{th}$-array global frame vectors onto a main system reference frame of a convex hull or hemisphere containing all the arrays, can be subsequently applied as described next, using FIG. 18. The embodiment shown in FIG. 16C is for a hemispherical body for the ommatidia arrays.

FIG. 18 shows a vector transformation from a local unit ommatidia array of sensors 1820 on a body 1810 to global coordinates for the body as a whole. The global coordinate system for the spherical coordinates shown in FIG. 18 is an orthogonal rectangular (x, y, z) frame whose origin and z-axis coincide with the center of symmetry and axis of symmetry of the hemisphere, respectively. The polar angle $\Theta_i$ for the $i^{th}$-photoreceptor or terminator is measured relative to the z-axis, and the azimuthal angle $\Phi_i$ is measured counter-clockwise from the x-axis of the right-handed reference frame. The x-axis is the preferential or reference axis, such as for a supporting structure or vehicle. Each photo sensor (in the embodiment that a single ommatidium is at each location) or each ommatidia array (e.g. 49-sensor arrays) in the hemisphere has its own local reference plane and an associated local frame that can be defined as follows.

The normal-to-the-surface unit vector to the $i^{th}$-photoreceptor or array is given, as can be derived from FIG. 18 relative to the system's (x, y, z) reference frame, as it is parallel to the radial vector $R_i$, by:

$$\hat{u}_i = \langle u_x, u_y, u_z \rangle = \langle \sin(\Theta_i) \cdot \cos(\Phi_i), \sin(\Theta_i) \cdot \sin(\Phi_i), \cos(\Theta_i) \rangle \quad \text{(III.A.3)}$$

This vector defines also the local horizon plane, a plane tangent to the hemispherical surface at the center of the ommatidium, or at the ommatidia array's center. The south-looking unit vector $\hat{s}_i$ is perpendicular to $\hat{u}_i$ and is contained in the plane defined by $\hat{u}_i$ and the z-axis (the trace or intersection between this plane and the hemisphere is called the local meridian of east-longitude $\Phi_i$). This local-frame unit-vector (or versor), $\hat{s}_i$, is defined by $$\hat{s}_i = \langle s_x, s_y, s_z \rangle = \langle \cos(\Theta_i)\cos(\Phi_i), \cos(\Theta_i)\sin(\Phi_i), -\sin(\Theta_i) \rangle \quad \text{(III.A.4)}$$

Finally, the east-looking unit-vector $\hat{e}_i$ forms with the other two a right-handed system. Hence, it is defined by $$\hat{e}_i = \hat{u}_i \times \hat{s}_i = \langle e_x, e_y, e_z \rangle = \langle \sin(\Phi_i), \cos(\Phi_i), 0 \rangle \quad \text{(III.A.5)}$$

The local frame given by the set $\{\hat{u}_i, \hat{s}_i, \hat{e}_i\}$ for the $i^{th}$—ommatidia, or array of ommatidia, is required for mapping any object's trajectory with respect to this local frame first, and then transform or map the image coordinates (or image position vectors) to the system or hemisphere frame given by the unit direction vectors $\{\hat{i}_i, \hat{j}_i, \hat{k}_i\}$. This system frame is assumed to be the body (the convex hull hemisphere of FIG. 18) which supports this system of ommatidia. So the hemisphere's image position vectors would in turn need to be transformed onto the body's reference frame by means of a chain product of homogeneous coordinates transformation matrices. Such matrices may include scaling, rotations, and translations from one frame to the next. An example of a homogeneous transformation matrix is given by $$\begin{pmatrix} x_0 \\ y_0 \\ z_0 \\ 1 \end{pmatrix} = \begin{pmatrix} R_{11} & R_{12} & R_{13} & \Delta x \\ R_{21} & R_{22} & R_{23} & \Delta y \\ R_{31} & R_{32} & R_{33} & \Delta z \\ 0 & 0 & 0 & 1 \end{pmatrix} \cdot \begin{pmatrix} x_i \\ y_i \\ z_i \\ 1 \end{pmatrix} \quad \text{(III.A.6)}$$

In more compact form, equation (III.A.6) can be written as $$\begin{pmatrix} \vec{x}_0 \\ 1 \end{pmatrix} = \begin{pmatrix} R & \Delta \vec{x} \\ 0 & 1 \end{pmatrix} \cdot \begin{pmatrix} \vec{x}_i \\ 1 \end{pmatrix} \quad \text{(III.A.7)}$$

In (III.A.7), $\vec{x}_0$ is the position vector of the image spot relative to the global frame, $\vec{x}_i$ is the position of the image spot relative to the $i^{th}$-ommatidia, R is a composite 3-axes Euler rotation matrix given by, $R = \Pi_{k=1}^{3} R_k(\alpha_k)$, and $\Delta \vec{x}$ is a displacement vector representing the translation of the ommatidia or ommatidia array origin to the global frame. The rotation matrix R can be written as $$R = \prod_{k=1}^{3} R_k(\alpha_k) = \begin{bmatrix} 1 & 0 & 0 \\ 0 & \cos(\alpha_x) & -\sin(\alpha_x) \\ 0 & \sin(\alpha_x) & \cos(\alpha_x) \end{bmatrix} \quad \text{(III.A.8)}$$

$$\begin{bmatrix} \cos(\alpha_y) & 0 & \sin(\alpha_y) \\ 0 & 1 & 0 \\ -\sin(\alpha_y) & 0 & \cos(\alpha_y) \end{bmatrix} \begin{bmatrix} \cos(\alpha_z) & -\sin(\alpha_z) & 0 \\ \sin(\alpha_z) & \cos(\alpha_z) & 0 \\ 0 & 0 & 1 \end{bmatrix}$$

Multiple ommatidia systems can provide improved detection and tracking capabilities, as will now be described. Other embodiments and applications include providing zooming detection and wider fields of view, as will be disclosed in sections III.C and section IV.

B. Inter-Ommatidia Feature Tracking Methods and Systems

In detection and tracking using multiple ommatidia systems, it may occur that an image feature either is near a boundary between two (or more) constituent unit ommatidia. Methods are now described for maintaining detection and tracking with hyperacuity.

Figure 19:
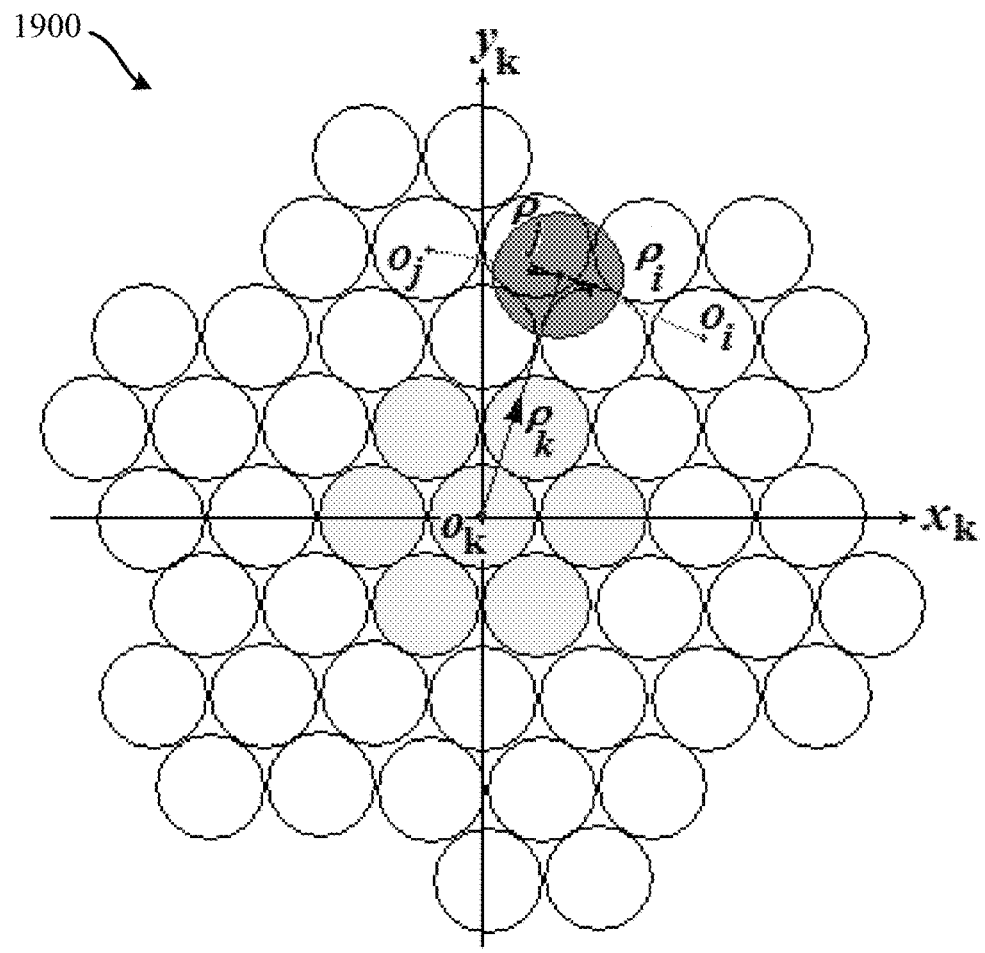
FIG. 19 shows the geometry for tracking an object image between ommatidia of a multi-ommatidia system, according to embodiments.

FIG. 19 shows the geometry 1900 for a method of tracking a moving image feature in a multi-ommatidia system as it transitions between the ommatidia in the system's array. The particular embodiment is described for the 7 hexagonal planar ommatidia configured as described in FIG. 16A, 1620. However, it can be understood that the methods to be described can be adapted to other configurations.

During the transition, that is, when the light spot of the image feature begins to appear on a neighboring ommatidia and begins to fade out of the present ommatidia, the local vectors would point to the center of mass of that portion of the image light spot that affect the particular ommatidia. Because of this, the transformed vectors of each ommatidia excited by the light spot would differ by some relatively small amount. If precision tracking is required, there are two methods that can be followed to obtain the best estimates for the global set ($\rho_k$, $\varphi_k$): (i) Perform a weighted average of the two sets obtained by the transformations (1) and (2), where the weights would be computed as the ratio of the intensities (equivalent to areas) of the parts of the spot on each ommatidia, divided the total light spot intensity. That is, if I is the total light spot intensity, and $I_1$ and $I_2$ are the respective spot intensities detected on each ommatidia, then the weights $w_1=I_1/I$, and $w_2=I_2/I$, respectively. Then, these weights are used to perform a weighted average in both rho's and thetas obtained in the two transformations; or (ii), utilize a dynamic state estimator/propagator (or state predictor).

Figure 22:
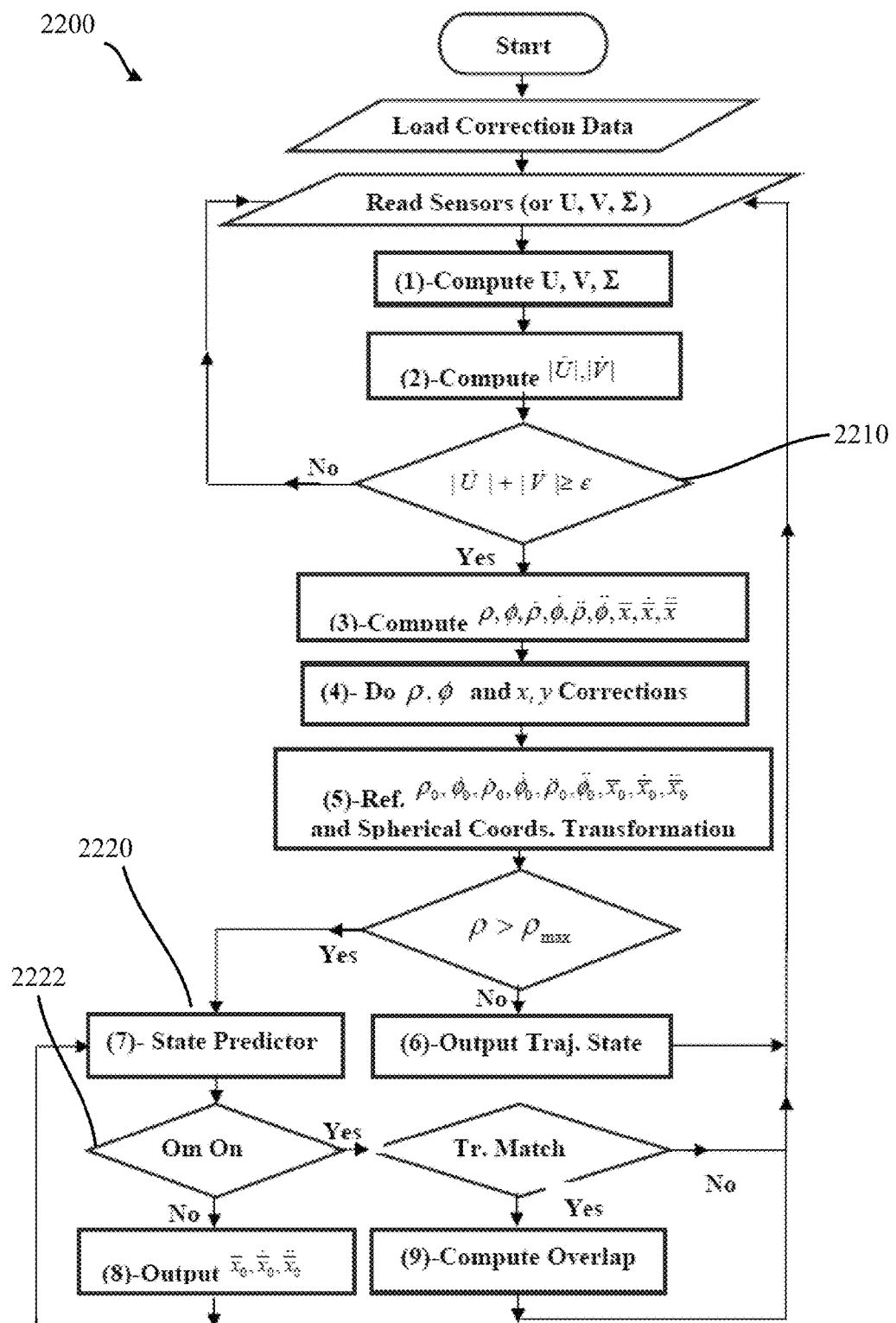
FIG. 22 is a flow chart of a method of tracking an object image in a multi-ommatidia system, according to embodiments.

FIG. 22 shows a flow chart for an exemplary method 2200 that adapts previously described detection and tracking methods for multiple ommatidia systems. The steps are as disclosed previously but have now added the step 2210 which uses the size of the derivatives of U and V to determine if motion is occurring. The test is whether the sum of the absolute value of the derivatives exceeds a specified threshold ε. In step 2220, in the case that the radial distance is found to exceed a minimum threshold, indicating the image feature is near another ommatidium, a kinematic state predictor determines whether another ommatidium has also detected the image feature. In the case, tested at the Om On decision branch, that another ommatidium indeed has also detected the image feature the method proceeds to either compute an overlap or continue with sensor readings.

C. Meta-Ommatidia Zooming Methods

This section describes methods and systems by which, in a multiple ommatidia system, the separate ommatidia can be used hierarchically to provide location zooming. In some of these embodiments a location obtained for an image feature with respect to global coordinates of the multiple ommatidia system is used to select a component ommatidium of the ommatidia system, and the signals of that component ommatidium are then used to provide a finer resolution location. These hierarchical configurations of multiple ommatidia may be generalized to include the ability to zoom using both the differencing and the orthogonal decomposition methods previously described.

Figure 20:
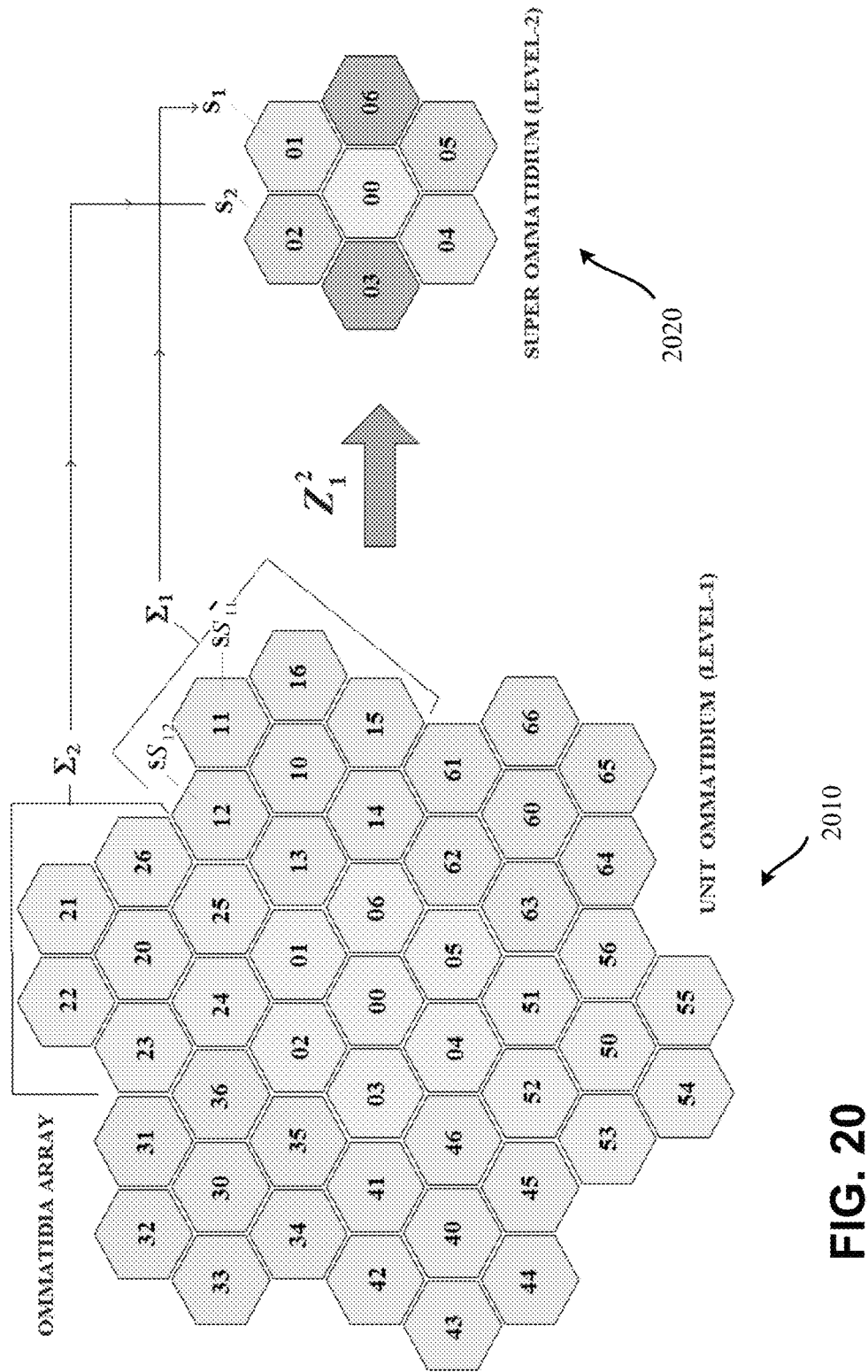
FIG. 20 shows a zooming method of a multi-ommatidia system, according to embodiments.

First embodiments of zooming make use of the orthogonal decomposition approach of section II.C. FIG. 20 illustrates how a multiple ommatidia system 2010 with 49 sensors can have its signals summed to produce a reduced set of seven signals and so effectively act as a seven sensor single ommatidium 2020. This can allow for less processing when the effective ommatidium is providing desired detection and tracking accuracy.

Figure 21:
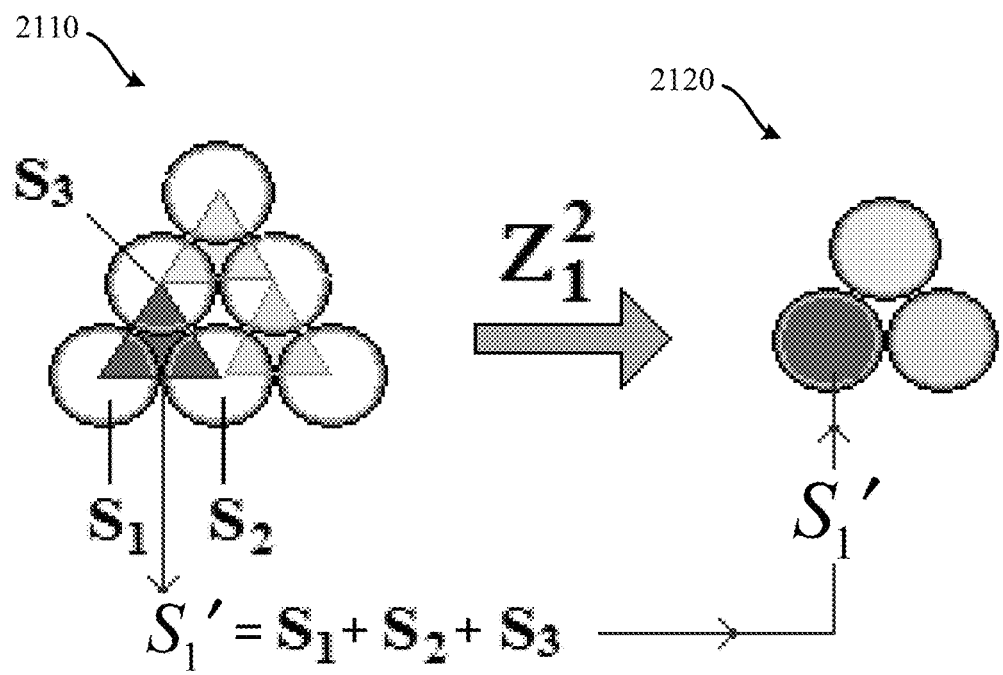
FIG. 21 shows a zooming method of a multi-ommatidia system, according to embodiments.

FIG. 21 shows an alternate configuration 2110 of a nine sensor ommatidium. The particular arrangement into triangles of 2110 allows for sensor signal summation to produce a reduced signal set to function as the reduced ommatidium 2120.

D. Dynamic Reconfiguration in Multiple Ommatidia Systems

In the multiple ommatidia systems and methods described so far, it was presumed that the individual sensors of the entire system were uniquely assigned to respective unit ommatidia. This section describes systems and methods by which the arrangement of the individual sensors of the entire system can be dynamically reconfigured "on the fly" to provide improved tracking and detection. Such methods and systems are described with respect to the particular embodiment shown in FIG. 23. However, it will be clear to one of skill that the methods and systems can be adapted to other configurations.

Figure 23:
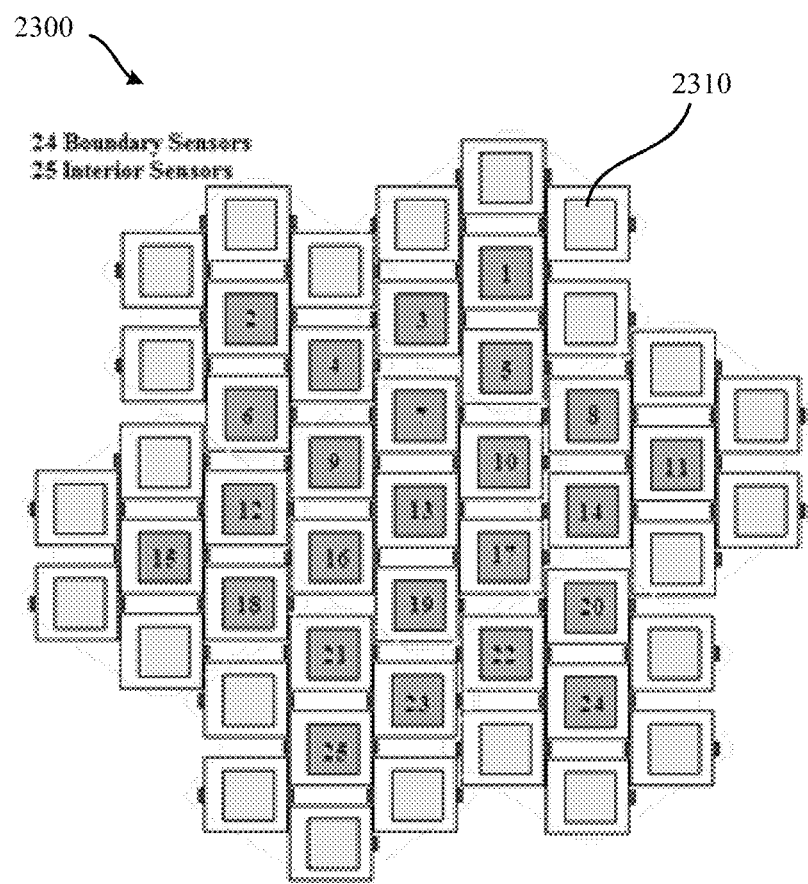
FIG. 23 shows a multi-ommatidia system having adaptive grouping of sensors into ommatidia, according to embodiments.

FIG. 23 shows the configuration 2300 of sensors of the multiple ommatidia configuration 1610, with internal sensors explicitly enumerated. Also indicated are boundary sensors 2310. The methods may comprise reselecting which individual sensors are to form the respective sensors of unit seven sensor hexagonal ommatidia. Once, e.g., the sensor chosen to be the central sensor of the central ommatidium is selected, the reorganization of the sensors into respective unit ommatidia is then chosen accordingly.

Figure 24:
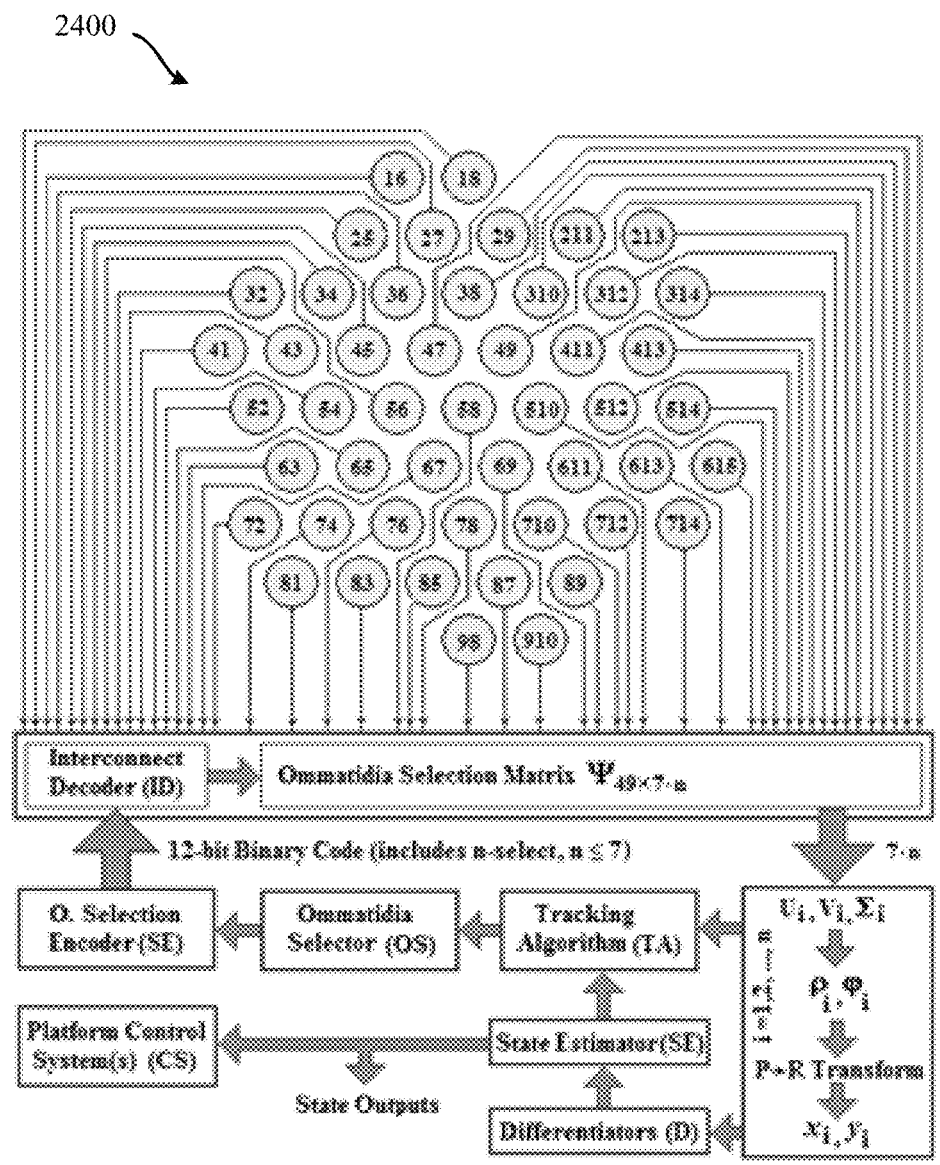
FIG. 24 shows a functional block diagram for adaptive grouping of sensors into ommatidia within a multi-ommatidia system, according to embodiments.

FIG. 24 shows a block diagram of the operations that perform the reorganization of the sensors. One limitation that may be enforced is that only interior sensors can be selected as centers for unit ommatidia. The methods and systems illustrated in FIG. 23 and FIG. 24 may be used in the systems next described for multiple ommatidia systems and methods for increased field of view.

IV. HYPRIS System Applications of Ommatidia Systems

The following describes further embodiments (referred to as HYPRIS™) that extend and apply the embodiments disclosed above. HYPRIS™ embodiments provide continuous kinematic target tracking and may be expanded to any arbitrary field of view by combining multiple ommatidia into a multi-layered hierarchy, much like a compound eye structure. Inter-ommatidia processing and tracking may be accomplished using analog or sampling with numerical processing. In this section the objects discussed above will also be referred to as targets.

HYPRIS™ embodiments are based on modularity of the multiple ommatidia methods and systems. This modularity facilitates the placement of ommatidia on a smooth curved surface (such as vehicle hulls, aircraft wings, or missiles) providing full-surround situational awareness without breaking aerodynamic contours. The ability to operate on a wingtip rather than an airframe centerline may be made possible by real time compensation for wing motion relative to the airframe. The compound eye structure is useful for small or large airframes as it does not require pan and tilt control or large volume aplanatic optics.

A. Wide FoV Methods with Multiple Ommatidia

HYPRIS's modular system is extensible up to a full spherical FoV. A basic single ommatidium module may operate over a limited field of view (FoV); in some case this may be approximately ten degrees. Parallel, analog processing of a single ommatidium produces the continuous analog signals representing the kinematic states of up to six targets for the seven sensor ommatidium embodiment used as examples above. (Recall also that a greater number of targets can be tracked with other configurations.) Two embodiments for creating a wide FoV using an ommatidium are as follows. The first method assumes that the kinematic state signals of each ommatidium, arranged on a compound surface to achieve the desired FoV, will be numerically sampled and processed using algorithms to facilitate inter-ommatidia tracking of targets across the entire FoV.

Although numerical processing is employed to accomplish multi-segment tracking, HYPRIS may use embedded processors to greatly reduce the computational burden required by image-based kinematic analysis of targets.

A second approach uses the multi-layer, hierarchical processing architecture possible with multi-ommatidia systems. This replicates the same sensing and processing methods of a basic ommatidia module at successively higher meta levels in order to preserve the ability to detect and track multiple targets over a wide FoV on a continuous analog basis. Information is propagated from higher to lower layers to detect, isolate and track objects with increasingly greater spatial resolution all in the analog domain. Since HYPRIS's parallel analog processing is not constrained by the Nyquist digital sampling rate and the processing limitations of image based sensor systems, it allows for very high speed operation.

The methods and systems may implement the capacity to calculate and subtract self-motion of a imaging sensor platform already exists but requires a separate reference system such as an INS or GPS for absolute accuracy or a large computational burden if self-motion is estimated from image-based analysis by the sensor system. In further embodiments, the methods and systems may implement embodiments that can be used to estimate and extract self-motion using kinematic state signals, which already contain motion cues, with algorithms and processing at a greatly reduced computational burden.

B. IR and Polarization Detection

In some embodiments, the multi-ommatidia configurations may use IR or polarization sensitive sensors.

C. High Level Partition Methods

Figure 25:
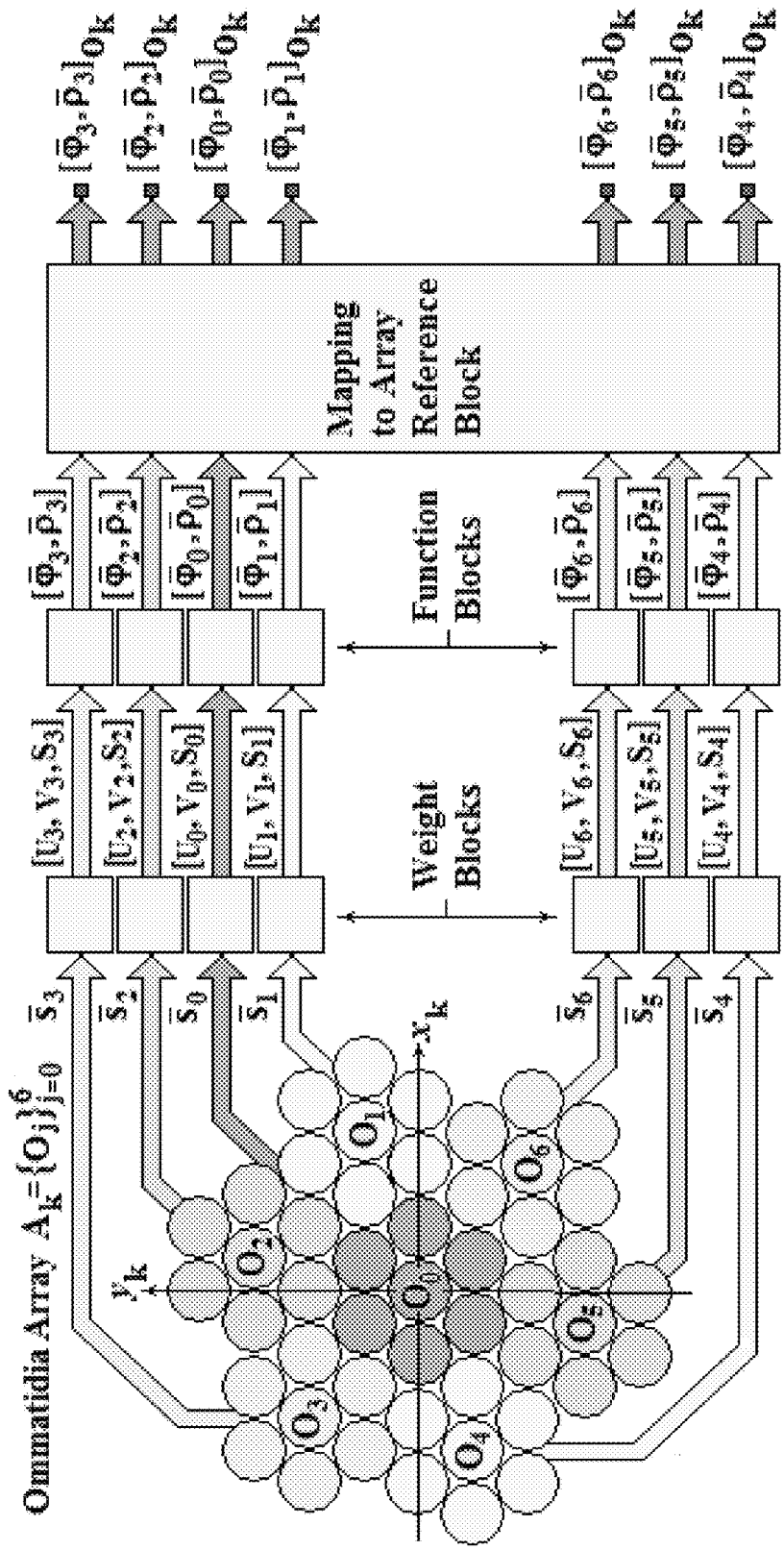
FIG. 25 is a block diagram for using orthogonal differencing methods in a multi-ommatidia system, according to embodiments.

FIG. 25 shows a block diagram of a multiple ommatidia system as described in relation to FIG. 16A. The multiple ommatidia system is shown, in this embodiment, using an orthogonal decomposition method described in section II.C.

Figure 26:
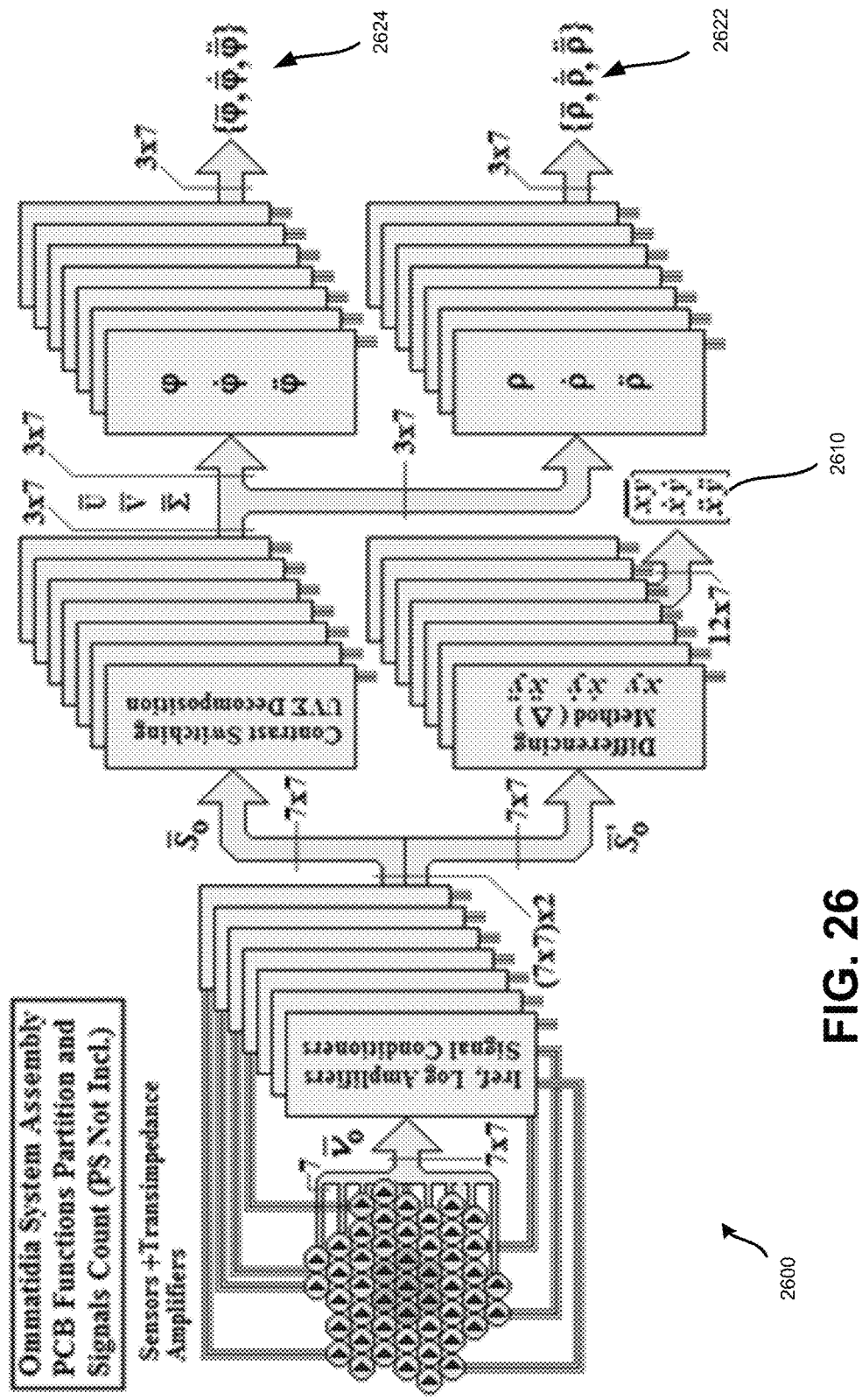
FIG. 26 is a block diagram for combined methods in a multi-ommatidia system, according to embodiments.

FIG. 26 shows a block diagram 2600 of how the multiple ommatidia system of FIG. 25 can be implemented to use both differencing and orthogonal decomposition methods. The outputs of the differencing method applied to the unit ommatidia comprise the locations, velocities and accelerations, 2610, with according to respective rectangular coordinates systems of the unit ommatidia. Further outputs 2622 and 2624 are obtained using orthogonal decomposition methods, and comprise respective radial distances and incident angles from each of the unit ommatidia. The outputs may be combined to produce net location and trajectory information.

Figure 27:
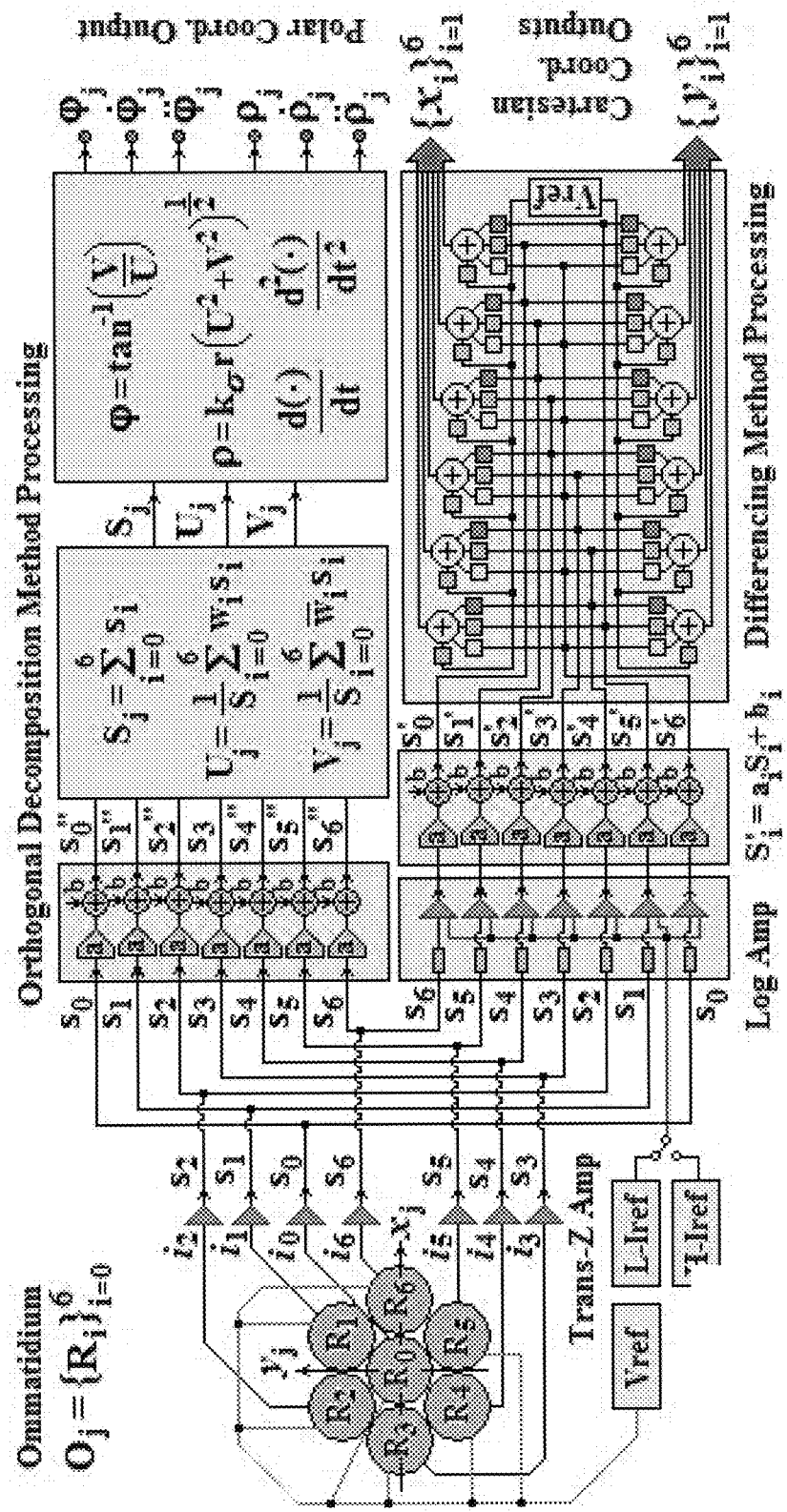
FIG. 27 is a component block diagram for combined methods in a multi-ommatidia system, according to embodiments.

FIG. 27 shows a component level block diagram of the multiple ommatidia system of FIG. 26. As shown, it can be implemented with continuous real-time analog components to avoid problems due to sampling limits and latency.

By implementing one or more multiple ommatidia systems, HYPRIS methods and systems can be configured to detect and track multiple targets over a wide field of view.

What is claimed is:

1. A method of calculating a position of a feature of an object at hyperacuity accuracy, the method comprising:
  receiving output signals from a plurality of sensors, wherein the plurality of sensors:
    are configured in an array;
    have overlapping spatial response profiles, wherein for each of the plurality of sensors, the spatial response profile is non-linear and is axio-symmetric about a respective center of the sensor; and
    produce the output signals based on the spatial response profiles;
  generating logarithmically amplified output signals by applying logarithmic amplification to each output signal;
  multiplying the amplified output signals by predefined constants that are based on:
    distances between each of the plurality of sensors and a physical origin of the array; and
    a rate of response decay of each of the plurality of sensors; and
  determining coordinates of the position of the feature with respect to the physical origin of the array by summing the logarithmically amplified output signals.

2. The method of claim 1 wherein the non-linear spatial response profiles of the sensors have an approximately Gaussian profile.

3. The method of claim 1 wherein determining the coordinates of the position of the feature with respect to the physical origin of the array comprises using a linear combination of the logarithmically amplified output signals of at least three sensors, at least two of the at least three sensors being adjacent.

4. The method of claim 1 further comprising determining at least one of a velocity and an acceleration of the feature by calculating time-derivatives of the position of the feature.

5. The method of claim 1 wherein:
  the sensors are optical sensors arranged on a focal plane of an objective lens;
  the feature is a component of a focused image of the object; and
  processing of the output signals is performed with analog circuitry in real time.

6. The method of claim 5 wherein:
  the array comprises six optical sensors that are arranged hexagonally around a central optical sensor; and
  the physical origin of the array is a center of the central optical sensor.

7. The method of claim 5, further comprising determining positions of a plurality of dependent or independent features, wherein independent features comprise focused images of respective objects, wherein a quantity of features in the plurality of features is at most one less than a total number of the optical sensors, and wherein the determination of the positions of the features uses at least the logarithmically amplified output signal of a central optical sensor and of another optical sensor.

8. A tracking system for determining a position of a feature of an object at hyperacuity accuracy, the tracking system comprising:
  an array comprising a plurality of sensors, wherein for each of the plurality of sensors a spatial response profile is non-linear and is axio-symmetric about a respective center of the sensor, and the sensor produces an output signal based on the spatial response profile; and
  components configured to receive the output signals from the sensors, wherein, in response to receiving the output signals from the sensors, the components process the received output signals by:
    generating logarithmically amplified output signals by applying logarithmic amplification to each output signal;
    multiplying the amplified output signals by predefined constants that are based on:
      distances between each of the plurality of sensors and a physical origin of the array; and
      a rate of response decay of each of the plurality of sensors; and determining coordinates of the position of the feature with respect to the physical origin of the array by summing the logarithmically amplified output signals.

9. The tracking system of claim 8, wherein:
the plurality of sensors are optical sensors arranged on a focal plane of an objective lens;
each of the optical sensors is configured with a respective sensor lens, so that the objective lens and the respective sensor lens of each optical sensor are arranged to produce the non-linear spatial response profile of the optical sensor; and
the feature is a component of a focused image of the object.

10. The tracking system of claim 8 wherein:
the non-linear spatial response profiles of the plurality of sensors have an approximately Gaussian profile.

11. The tracking system of claim 8 wherein:
processing of the output signals is performed with analog circuitry in real time; and
wherein determining the coordinates of the position of the feature with respect to the physical origin of the array comprises using a linear combination of the logarithmically amplified output signals of at least three sensors, at least two of the at least three sensors being adjacent.

12. A method of calculating positions of features of an object at hyperacuity accuracy, the method comprising:
receiving output signals from a plurality of sensors, wherein the plurality of sensors:
are configured in an array;
have overlapping spatial response profiles, wherein for each of the plurality of sensors, the spatial response profile is non-linear and is axio-symmetric about a respective center of the sensor; and
produce output signals based on the spatial response profiles; and
processing the signals by:
applying logarithmic amplification to each output signal; and
determining positions of a plurality of dependent or independent features with respect to a physical origin of the array using a linear combination of the logarithmically amplified output signals, wherein:
the independent features comprise focused images of respective objects;
a quantity of features in the plurality of features is at most one less than a total number of the plurality of sensors; and
determining the positions of the features uses at least two of the logarithmically amplified output signals comprising the logarithmically amplified output signals of a central sensor and of another sensor in the plurality of sensors.

13. The method of claim 12 wherein the non-linear spatial response profiles of the sensors have an approximately Gaussian profile.

14. The method of claim 12 wherein determining the positions of the features with respect to the physical origin of the array comprises using a linear combination of the logarithmically amplified output signals of at least three sensors, at least two of the at least three sensors being adjacent.

15. The method of claim 12 further comprising determining at least one of a velocity and an acceleration of each of the plurality of features by calculating time-derivatives of the positions of each of the plurality of features.

16. The method of claim 12 wherein:
the plurality of sensors are optical sensors arranged on a focal plane of an objective lens;
each feature is a component of a focused image of the object; and
processing of the output signals is performed with analog circuitry in real time.

17. The method of claim 16 wherein:
the array comprises six optical sensors that are arranged hexagonally around a central optical sensor; and
the physical origin of the array is a center of the central optical sensor.

* * * * *